Feb. 4, 1930.  J. ALBRECHT  1,746,021
BOX MAKING MACHINE
Filed Jan. 19, 1925  10 Sheets-Sheet 5
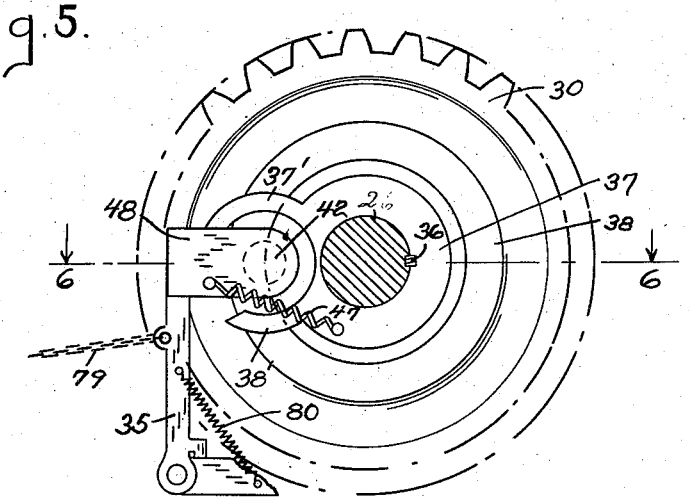
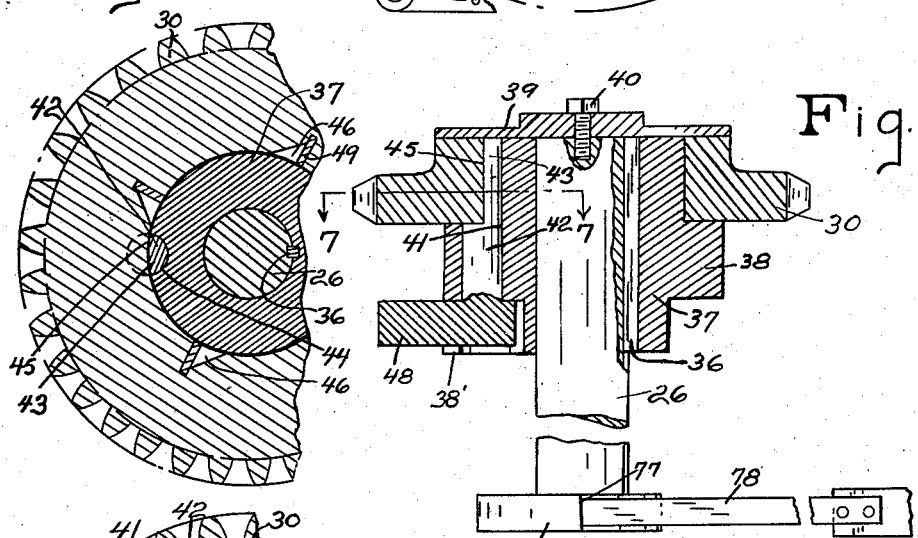
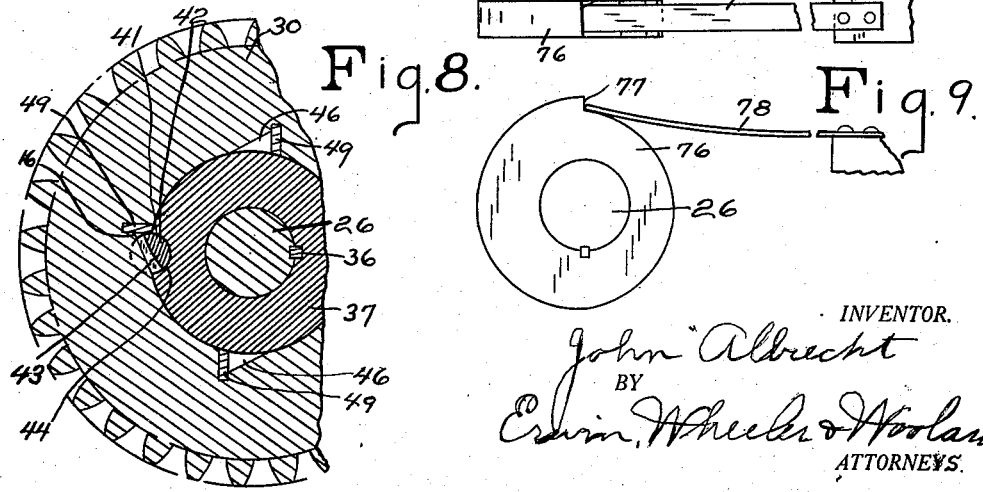
INVENTOR.
John Albrecht
BY
Erwin, Wheeler & Woolard
ATTORNEYS.

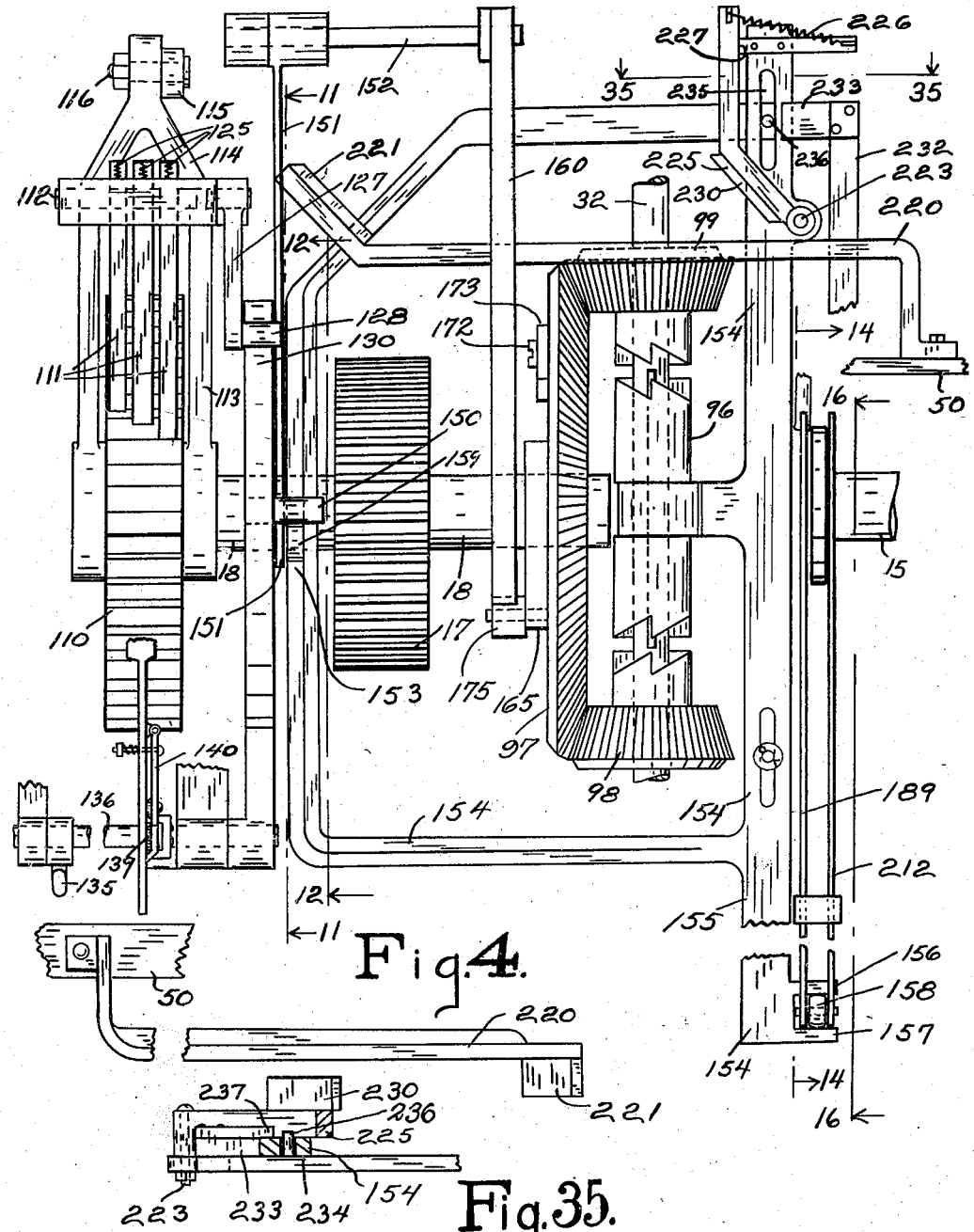

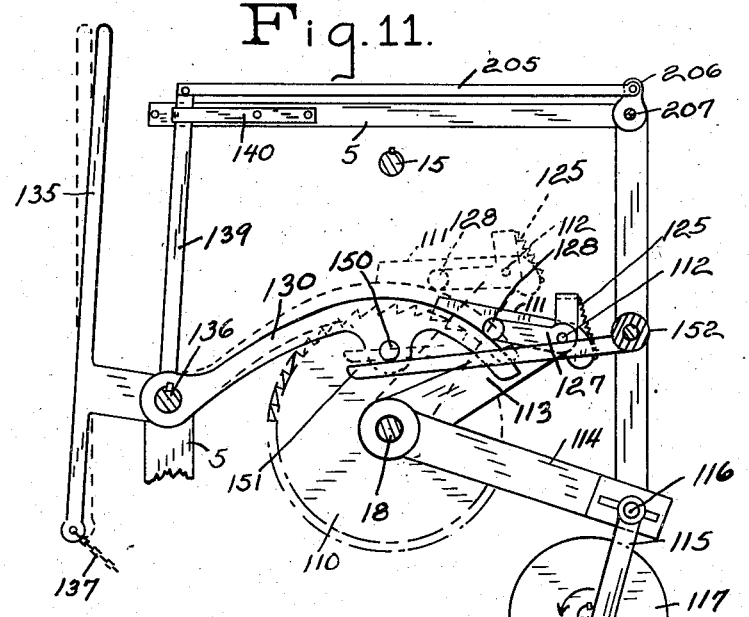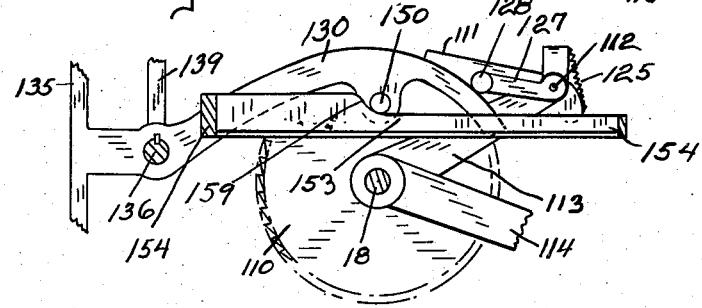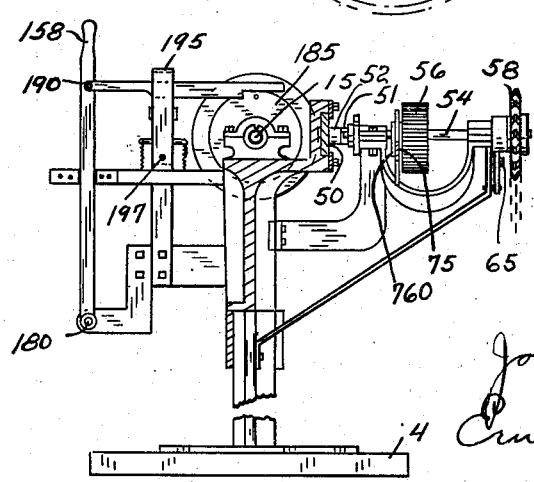

Feb. 4, 1930.  J. ALBRECHT  1,746,021
BOX MAKING MACHINE
Filed Jan. 19, 1925  10 Sheets-Sheet 7
Fig. 13.
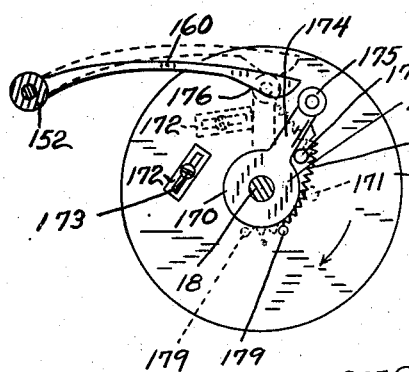
Fig. 14.
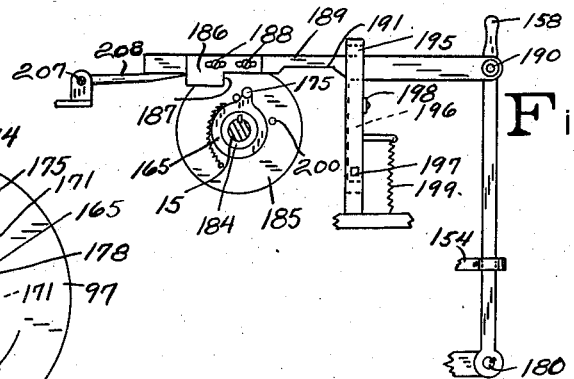
Fig. 15.
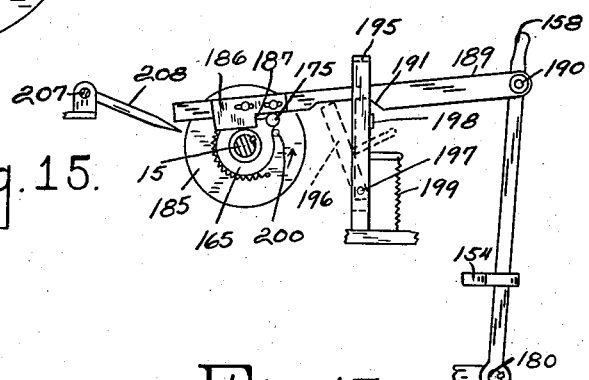
Fig. 16.  Fig. 17.
Fig. 18.
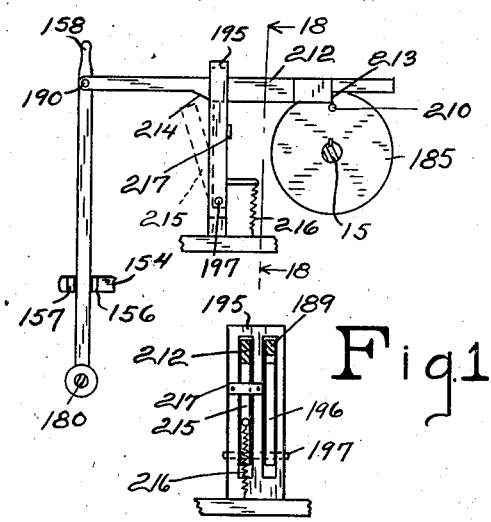
INVENTOR.
John Albrecht
BY
Erwin, Wheeler & Woolard
ATTORNEYS

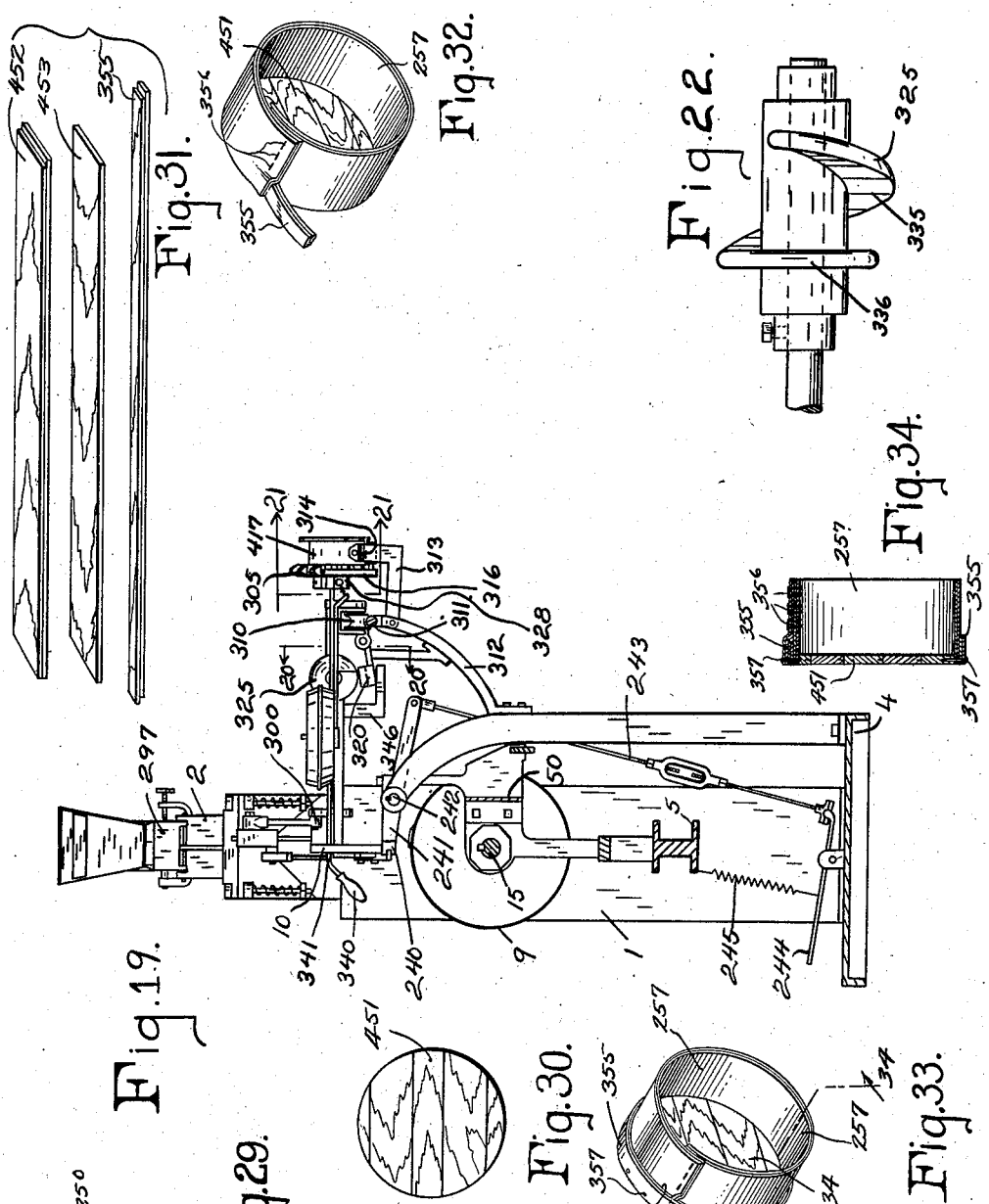

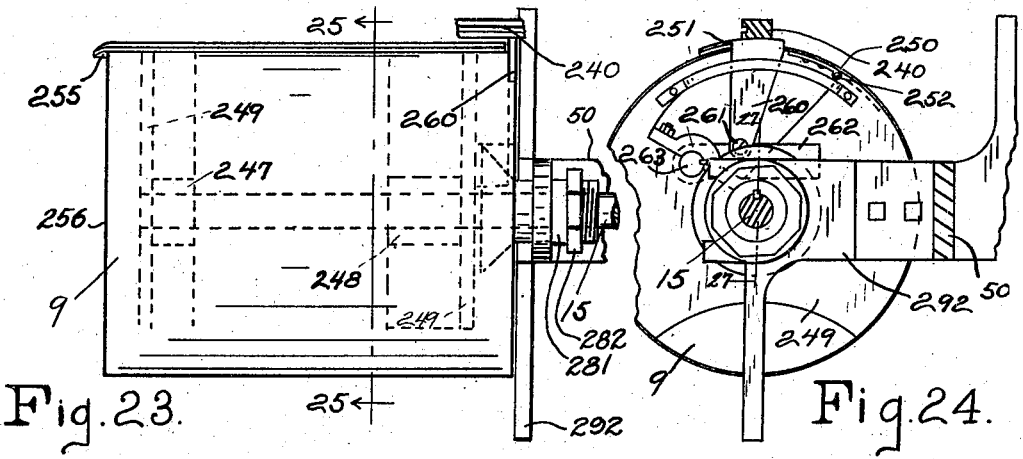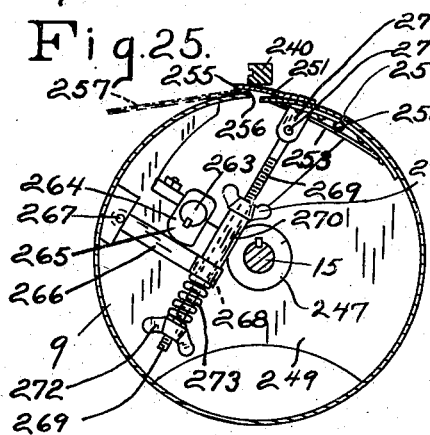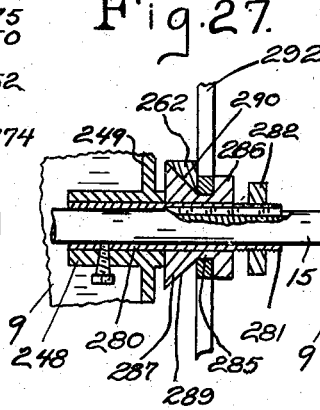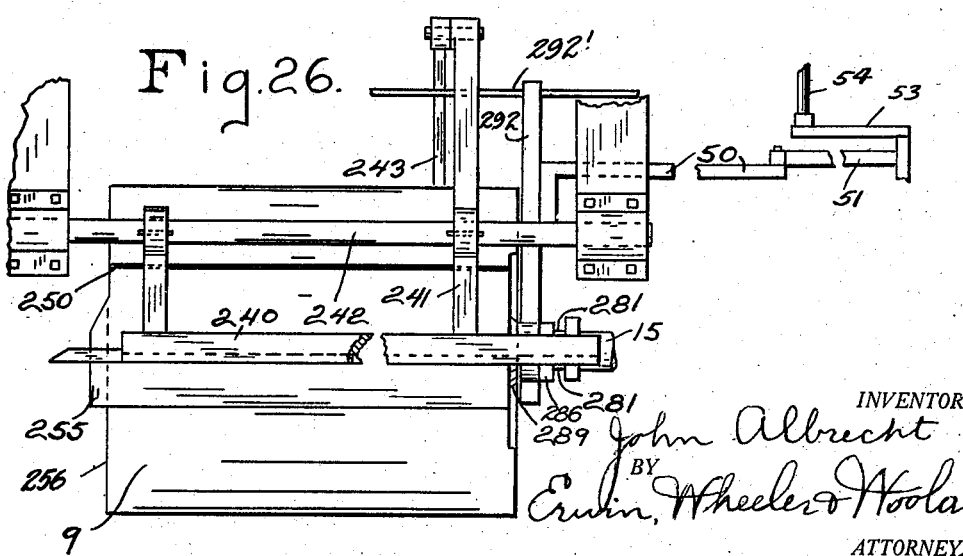

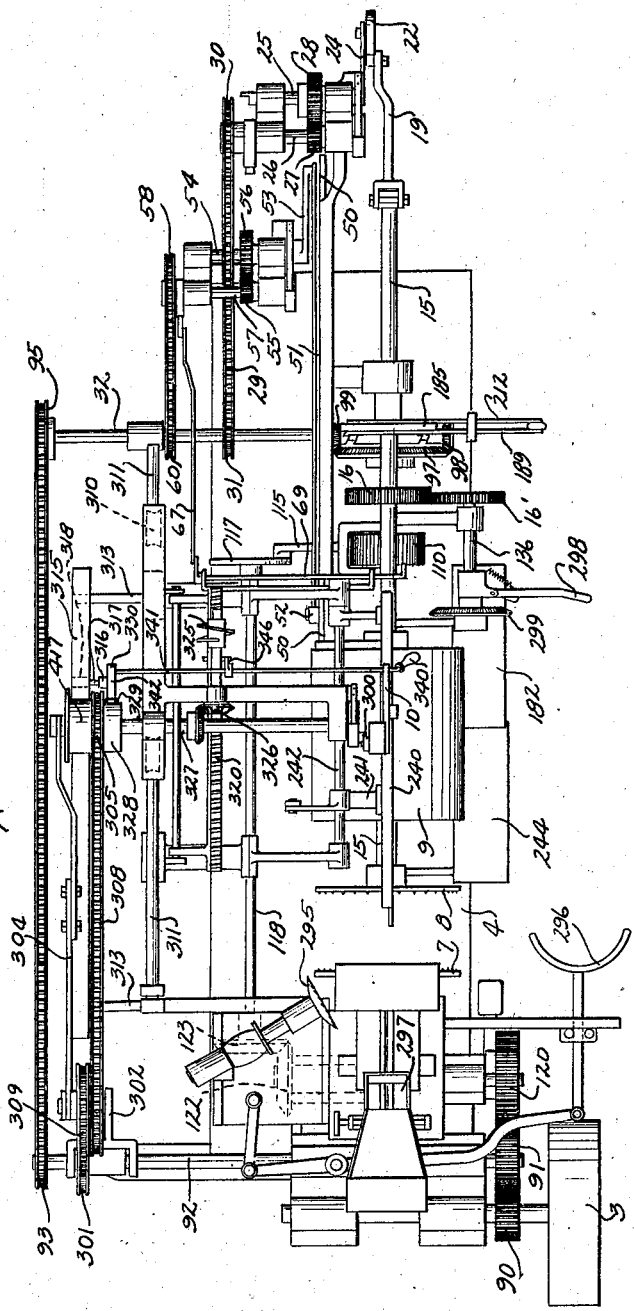

Patented Feb. 4, 1930

1,746,021

UNITED STATES PATENT OFFICE

JOHN ALBRECHT, OF KEWAUNEE, WISCONSIN

BOX-MAKING MACHINE

Application filed January 19, 1925. Serial No. 3,291.

This invention relates to improvements in the art of box manufacture. More particularly stated this invention relates to a machine constituting an improvement on the machine disclosed in my Patent No. 1,460,693 of July 3, 1923, and also an improved method of box manufacture.

It is the object of this invention to improve the machine disclosed in said patent by increasing the degree to which such machine and the several parts thereof are operated mechanically and automatically; also to provide a series of interlocking controls to prevent the operator from setting the parts in motion in improper sequence.

It will readily be understood that the rapidity of operation and the consequent efficiency of a machine of this character may be greatly increased by providing for the mechanical operation of parts hitherto adjusted manually. The operation of box making, however, involves uncertain factors which necessitate the performance of all operations under the general guidance of a human intelligence. The operator is required to feed material to the machine in a particular manner and initiate at the proper times the several operations whereby the completed box is formed.

In performing these opeartions mechanically and at great speed therefore, care must be taken to guard against such mistakes as might be made by the operator and which might result in serious injury to the operator or in breakage of the machine.

More particularly stated, it is my object to make practical the acceleration of operations conducted on a machine of this character by providing a system of interlocking controls so that regardless of the speed at which such operations are mechanically conducted, the operator cannot, by becoming bewildered, and by initiating operations in improper sequence, set parts in motion which might break up the machine, with possible injury to himself.

There are many other objects of this invention. They include the provision of an automatic cross stapling mechainsm and a novel and improved feed therefor, provision of an automatic control of the drum upon which the boxes are formed whereby such drum will rotate to a predetermined degree providing for the necessary overlap and will subsequently return automatically to its original position; to provide for mechanical high speed operation of the flange which engages the work and of the drum or block upon which the work is shaped; to provide means for engaging the work with the drum and for releasing the work from the drum before the drum is retracted; to provide improved means for controlling the degre of movement of the several parts, and to provide means for automatically stopping at proper times the several operations manually initiated.

Figure 4 is an enlarged fragmentary detail in plan of a portion of the mechanism shown in Figure 3.

Figure 5 is a side elevation of a particular type of clutch which it is preferred to use in connection with this invention.

Figure 6 is a section taken on line 6—6 of Figure 5.

Figure 7 is a fragmentary section taken on line 7—7 of Figure 6.

Figure 8 is a view similar to Figure 7 showing the parts in different relative positions.

Figure 9 is an elevation showing the backlash cam stop illustrated in plan in Figure 6.

Figure 10 is a section taken on line 10—10 of Figure 3.

Figure 11 is a detail view comprising an enlarged section taken on line 11—11 of Figure 4.

Figure 12 is a view similar to Figure 11 taken on section 12—12 of Figure 4.

Figure 13 is a detail view in side elevation of automatic mechanism for lifting the ratchet dogs shown in Figures 11 and 12.

Figure 14 is a detail view taken on a section indicated at 14—14 in Figure 4.

Figure 15 is a view similar to Figure 14 showing the parts in different relative positions.

Figure 16 is a detail view taken on section 16—16 of Figure 4.

Figure 17 is a view similar to Figure 16 showing the parts in different relative positions.

Figure 18 is a section taken on line 18—18 of Figure 16.

Figure 19 is a section taken generally on line 19—19 of Figure 3, certain parts unnecessary to an understanding of the mechanism at the end of the machine being omitted.

Figure 20 is a detail view taken on a section indicated at 20—20 in Figure 19 with parts in the background omitted for the sake of clearness.

Figure 21 is a detail view taken on a section indicated at 21—21 in Figure 19.

Figure 22 is a detail in plan of deformed worm.

Figure 23 is a front elevation of the drum and associated parts.

Figure 24 is an end elevation of the drum.

Figure 25 is a sectional view taken on section 25—25 of Figure 23.

Figure 26 is a detail view in plan of the pressure bar and the connections for actuating the mechanism of the drum.

Figure 27 is a detail view taken generally on a section indicated at 27—27 in Figure 24.

Figure 28 is a view similar to Figure 27 showing the parts in different relative positions.

Figure 29 is an isometric view of the blank in readiness to be acted upon by a machine embodying this invention.

Figure 30 is a side elevation of the blank after it has been sawed to the form of a disk and is ready for use as a box bottom.

Figure 31 represents the material used to construct the sides and re-enforcement of the box.

Figure 32 is an isometric view of a partially completed box after the side material has been fastened together about the bottom but has not yet been secured thereto.

Figure 33 shows a completed box isometrically.

Figure 34 is a section through the completed box taken on line 34—34 of Figure 33.

Figure 35 is a detail view in rear elevation of parts which interact in one direction only of their relative movement to engage a clutch for effecting a subsequent operation of the machine.

Figure 36 is a general plan view.

Like parts are identified by the same reference characters throughout the several views.

Figure 1:
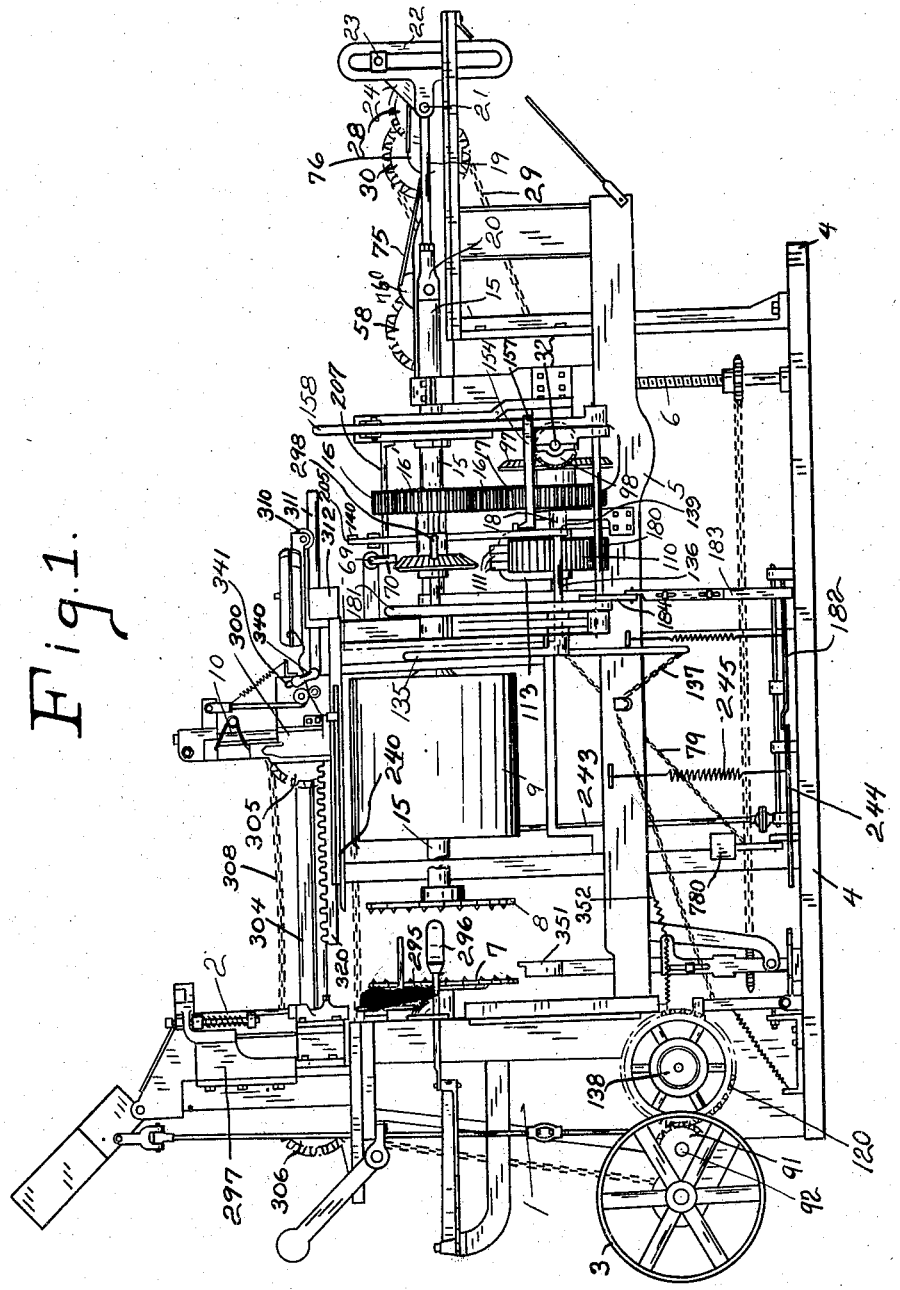
Figure 1 is a front elevation of a machine embodying this invention.

The frame structure of the present machine is very similar to that disclosed in my prior patent above referred to. Column 1 supports an automatic nailing device designated in its entirety by reference character 2 and also carries the primary power source for the machine which comprises, in the present device, a pulley 3 from which all of the other mechanism is driven.

The column is connected with a base 4 with reference to which the sub-frame 5 is adjustable by means of screws 6. The working parts of the machine are practically all carried by the column 1 and the sub-frame 5.

It will be understood from my former patent that the blank from which the bottom or head of a box is to be formed will be gripped between two chuck disks 7 and 8, commonly termed "flanges" in the box maker's art, and after this blank has been cut or trimmed to the desired circular contour, a side wall blank will be engaged by suitable clamping jaws carried by a drum or mandrel 9, which will then be moved to bring a portion of one margin into registry with the margin of the previously contoured circular bottom. The side wall blank will then be progressively wound into cylindrical form with its side margin embracing said contoured bottom, to which it is progressively nailed or stapled. The wall is then released from the drum and the latter retracted axially from the open end of the box, whereupon a retraction of the chuck disk 8 from the chuck 7 releases the completed box. In the construction as shown in said former patent, much depended upon the skill and experience of the operator, whereas the machine herein described is so far automatically controlled and operated that the work of the operator is reduced to a mere sequence of simple operations which can be properly performed by any person of ordinary intelligence and the work expedited with the precision and speed of an automatically acting, mechanically operated mechanism.

*Main driving connections*

The shaft of the pulley 3 carries a gear 90 meshing with a gear 91 on a shaft 92, on the other end of which is a sprocket 93 connected by a chain 94 with a sprocket 95 on shaft 32, the latter carrying a clutch member 96 interlocking respectively with collars loosely mounted on the shaft 32 and integral respectively with beveled reversing gears 98 and 99 facing each other and meshing with the bevel gear 97 mounted on a jack shaft 18 carrying the driving gear 17. The driving gear 17 meshes with the gear 16 in splined connection with the shaft 15 which overlies the shaft 18. The drum or mandrel 9 is splined to the shaft 15, this drum being shown in detail in Figures 23 to 26, inclusive. The chuck disk 8 is mounted at the end of the shaft 15 nearest the column in a position to grip the box bottom blank between it and a similar chuck disk 7 mounted on a tail stock carried by the column 1. These chuck disks are provided with suitable work-engaging means such as teeth and are adapted to grip between them the blank 350 best shown in Fig. 29 preparatory to sawing the blank into the circular form of the box bottom illustrated in Figure 30. The cross shaft 32 carries sprocket gears 31 and 60, the gear 31 being connected by a chain 29 with sprocket gear 30 on shaft 26 and gear 60 being connected by a chain with a sprocket gear 58 on shaft 57. The sprocket gear 30 is loosely mounted on the shaft 26 and is connected therewith for operation by means of a Morgan clutch of the general type shown in Patent No. 586,711, dated July 20th, 1897, and also illustrated in Figures 5 to 9, inclusive.

The axial movement of adjustment of the shaft 15 is derived from the shaft 26, from which motion is transmitted through the gear wheels 27 and 28 (Fig. 3), crank shaft 25, crank arm 24, crank pin 23, vertically slotted link member 22 (Fig. 1) and connecting rod 19. The latter is pivotally connected with the link member 22 at 21 and is swiveled at 20 to the end of the shaft 15. The length of the crank arm 24 is such as to move the shaft 15 and chuck disk 8 in one direction to gripping engagement with the box bottom blank and to move it in the other direction to a box releasing position. The gears 27 and 28 which transmit motion from the shaft 26 to the shaft 25 are in a one to two ratio, whereby a complete rotation of shaft 26 will cause crank shaft 25 and its associated crank arm 24 to perform a half revolution. Therefore, by operating shaft 26 intermittently in one turn movements, starting from a uniform zero point, it is obvious that shaft 15 and its associated chuck disk 8 may be alternately moved axially to work gripping position and subsequently retracted to work releasing position. This movement of the driving shaft 26 is controlled by the Morgan clutch 33 which operates to connect the loose gear 30 with the shaft 26, as will now be described.

*Morgan clutch.* (*Figures 5 to 9, inclusive*)

It will be observed in Figure 6 that the sprocket wheel 30 is loosely mounted upon a sleeve 37, which is secured to the shaft by a key 36. The sprocket wheel is held against longitudinal movement by the sleeve flange 38 and a detachable disk 39, secured to the end of the shaft by the screw 40. The sleeve 37 has a longitudinal bore 41, extended in the form of a semi-cylindrical groove along the bearing portion of the sleeve which receives sprocket wheel 30. The oscillatory clutch dog 42 has an eccentric extension 43 which is received in this groove, normally with its cylindrically rounded portion 44 seated in the groove and its eccentric face 45 facing outwardly. To connect the sprocket wheel with the sleeve 37 and shaft 26, the clutch dog is oscillated to swing the portion 44 into one of the notches 46 in the interior surface of the sprocket wheel hub. The radial shoulders of these notches have strike plates 49.

The clutch dog is urged toward locking position by a tension spring 47 which connects an exterior arm 48 of the dog with the sleeve 37, but its movement to clutching position is normally limited by the spring actuated pivoted stop 35 (Fig. 5). The oscillatory movement of the dog arm to its normal position is limited by the stop 37' and to clutching position by the stop 38'. The stops are supported from the sleeve 37 and the stops 35 and 37' prevent over rotation and fix the shaft in its normal or zero position. Backlash or backward rotation of shaft 26 is prevented by a cam 76 (Fig. 9) provided with a shoulder 77 to be engaged by the resilient dog 780 when the shaft 26 is in its zero position of rest. The trip stop 35 may be released by a flexible connector or chain 79, whereupon spring 47 will oscillate the clutch dog into position of engagement in one of the sprocket wheel notches 46 as soon as such notch is brought into registry with the dog.

It will of course be understood that whenever the dog arm 48 has moved past the point of its engagement with the trip 35, a restoration of the trip to normal position will not permit it to re-engage the dog until the sprocket wheel and shaft have performed one complete revolution from the position of release. The trip may therefore be manually released and automatically re-engaged to release the Morgan clutch when the shaft has completed a single revolution. The clutch dog with its stops and trips conforms generally to the well known structure of a Morgan clutch and further description is therefore deemed unnecessary, except to state that the clutch as described with reference to shaft 26 may be taken as representative also of the clutches 59, 138 and 328 herein referred to.

*The drum or mandrel 9*

This drum is splined to the shaft 15 and axially reciprocated thereon, its reciprocative movement being derived from the shaft 57 through the gear wheels 55, 56, crank shaft 54, crank 53, connecting rod 51, slide rod 50 and the vertical shifter arm 292 (Fig. 26), the latter being forked and engaged between the flanges 286 and 287 (see Figs. 27 and 28) of a spool 285 loosely mounted on the hub sleeve 281 of the drum 9 between the drum hub 248 and a nut 282 threaded on said sleeve. The other end of the shifter fork 292 is guided by a supporting rod 292', as indicated in Figure 26. The connecting rod 51 is pivotally connected with the slide rod 50 at 52 and the length of the crank 53 determines the stroke or axial movement of the drum. The driving gears 55 and 56 for the crank shaft 54 are in a one to two ratio and a Morgan clutch 59 is employed to connect the gear 58 with the shaft 57, whereby shaft 57 may be given one complete turn with a corresponding half turn movement of shaft 54 to actuate the drum to the work receiving position in one instance and to the retracted position in the next instance, in the same manner that the shaft 15 is actuated as above described.

Interlocking controls

As previously indicated, the clutches 33 and 59 are manually engageable and are automatically disengaged. They are furthermore provided with a system of interlocking controls to prevent injury to the mechanism and to the operator such as might result through the accidental manipulation and release of one of these clutches at the wrong time.

Figure 2:
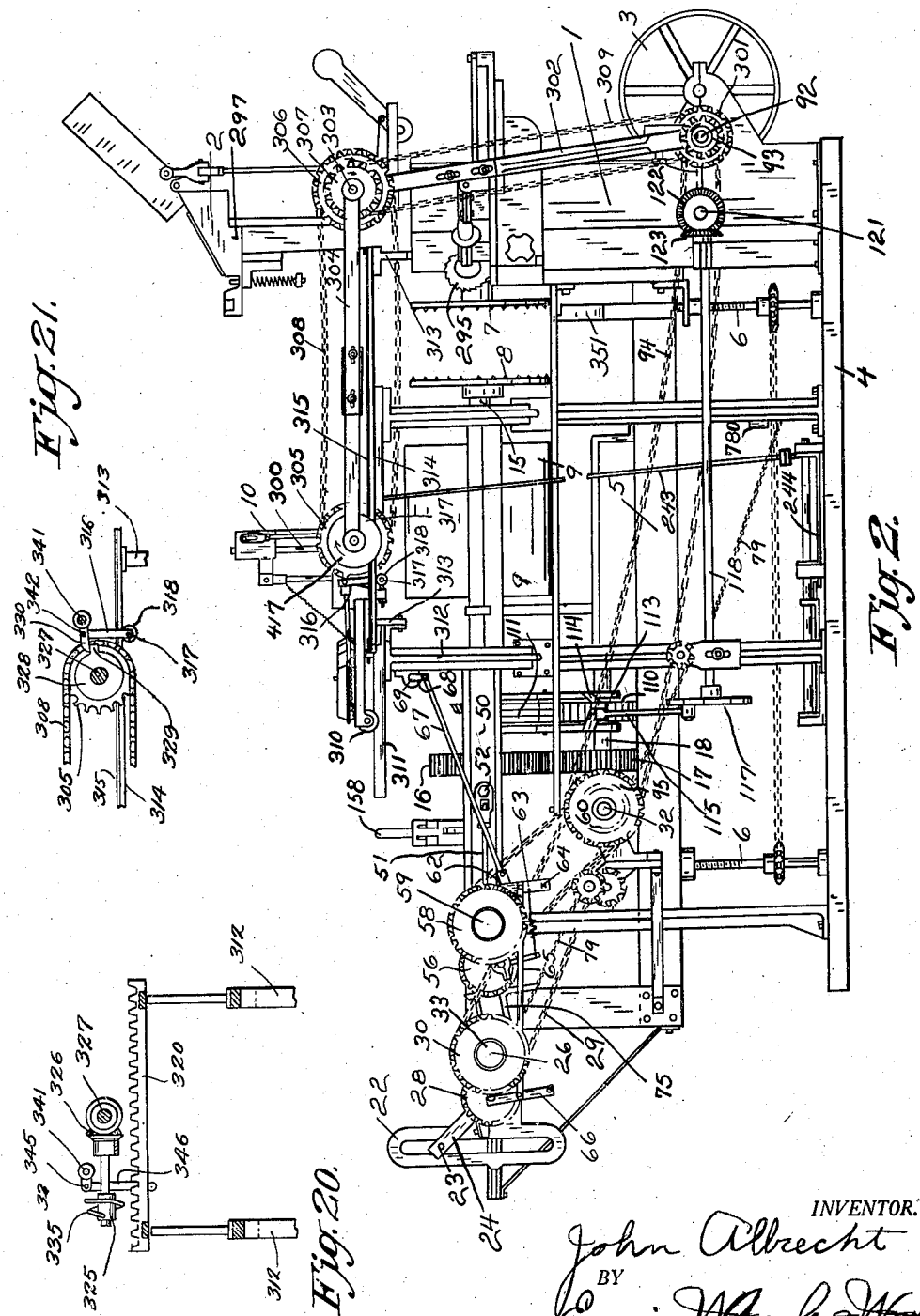
Figure 2 is a rear elevation of the machine shown in Figure 1.
Figure 3:
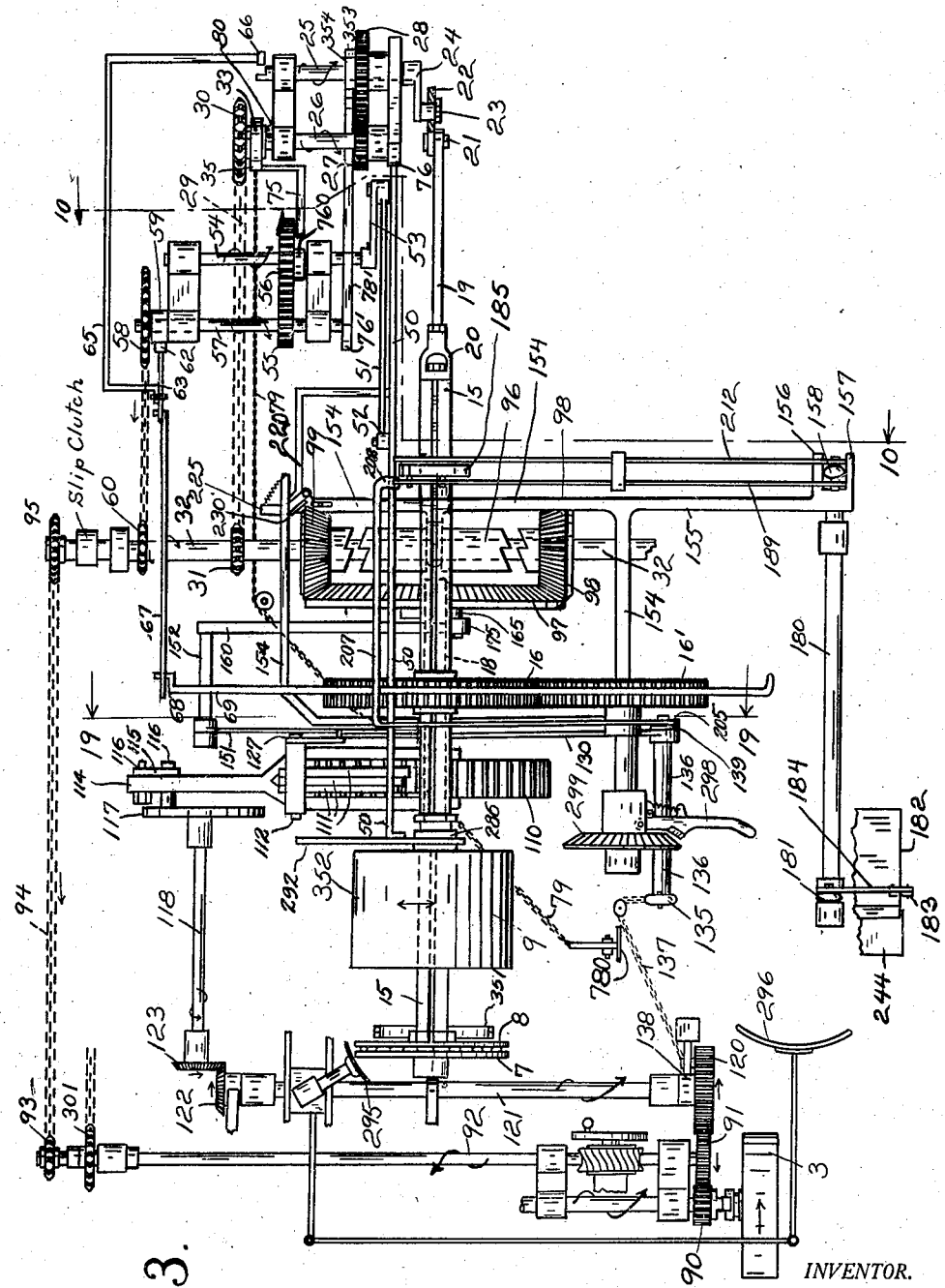
Figure 3 is a diagrammatic development in plan of the machine shown in Figures 1 and 2, some of the gears being diametrically enlarged to offset associated mechanism which would otherwise be concealed, the correct proportions and relative positions of the parts being shown in plan in Figure 36.

The stop member 62 (Figs. 2 and 3) which controls automatic clutch 59 may conveniently take the form of a lever 63 fulcrumed at 64 (Fig. 2) and connected by a link 65 with a similar lever 66. The two levers are synchronously operated by a link 67 which is connected to the arm 68 of the rock shaft 69 which extends toward the front of the machine and is provided at its forward end with an operating handle 70 (Fig. 1). Upon the oscillation of this handle the stop member 62 for operating clutch 59 may be oscillated about pivot 64 to permit the engagement of the clutch. It will be noted, however, that the end of shaft 25 is notched as indicated in Figure 3 and lever 66 must move into said notch when stop member 62 oscillates to permit the clutch 59 to engage. With the parts in the position indicated at Figure 3, therefore, it would be possible to engage clutch 59, but if shaft 25 were rotated one-half revolution to present its unnotched portion to lever 66, it would be impossible to operate clutch 59. This arrangement insures that the flange 8 will always be in its advanced position as indicated in Figure 3 before the drum 9 can be adjusted axially in either direction.

The stop member 35 which controls automatic clutch 33 carries rigidly a T-shaped arm 75 (Fig. 3) which moves therewith when it is not blocked by an eccentric member 760 (Fig. 3 and Fig. 1) carried by shaft 54. In Figure 3 the position of the eccentric member 760 is such that clutch 33 may be engaged to rotate crank 24 180 degrees and thereby to retract flange 8. If, however, crank 53 were in its opposite position so that drum or block 9 were advanced the eccentric member 760 would then be in such a position as to block the T-shaped arm 75 whereby to make the release of stop or trip 35 impossible. Under such conditions the operator would be prevented from making a mistake which might result in the retraction of the chuck disk 8 when the block or drum was in its advanced position.

When the eccentric stop member 760 is in a position to permit the movement of clutch controlling dog or stop 35, the latter may be actuated by the operator through the medium of a foot pedal 780 and a chain 79 which is suitably guided on pulleys where necessary and which is used to retract stop 35. The stop may be actuated in the opposite direction when pressures is relieved from pedal 780, by means of a spring 80.

The two interlocks above described prevent the power operation of the drum 9 and of the chuck disk 8 under any circumstances where the movements of either could cause injury to the other. I will now describe the means by which rotative movement is transmitted to shaft 15 and thence to block 9 and flange 8.

Step by step work rotation

The normal driving connections for rotating shaft 15 from the cross shaft 32 through the clutch 96 and reversing gears 98, or 99, have already been described.

But during nailing or stapling operations shafts 18 and 15 may also be given an intermittent step by step rotative movement in one direction through the medium of a ratchet wheel 110 carried by shaft 18 and a plurality of dogs 111 of slightly varying length which are mounted on a rock shaft 112 (Fig. 4) carried by a radial arm 113 which is oscillatory with reference to the shaft 18 and comprises a part of a bell crank (Figs. 11 and 12), the other arm 114 of which is operated by a connecting rod 115, crank pin 116, disc 117, and shaft 118. Shaft 118 (Fig. 3) is driven from gear 91 by gear 120, shaft 121 and bevel gears 122 and 123. It will be obvious that the continuous rotation of shaft 118 in the direction indicated by the arrow in Figures 3 and 11 will produce oscillation of the bell crank including arms 113 and 114 and a corresponding intermittent rotation of ratchet wheel 110. A spring 125 (Fig. 12) presses upon each dog in a direction to depress its other extremity into operative contact with the teeth of ratchet wheel 110.

Control of step by step movements

Rock shaft 112 is provided with a rocker arm 127 in which is a pin 128. This pin rides upon an arcuately formed support 130 (Figs. 11 and 12) which is so positioned in Figure 4 as not to interfere with the operative contact of dogs 111 with the ratchet wheel 110. The member 130, however, may be oscillated to the position in which it is shown in dotted lines in Figure 11 whereby to act upon pin 128 to oscillate rock shaft 112 and thereby to lift the dogs 111 out of contact with ratchet wheel 110. The dogs so lifted are supported for to and fro movement on the upper surface of member 130.

There are a number of different ways in which bar 130 may be oscillated to lift dogs 111 during the operation of the machine, both manual and automatic control in this regard being required at different stages of the work.

In the first place, bar 130 is in direct connection with the hand lever 135, being keyed to the cross shaft 136 upon which lever 135 is supported for oscillation. A chain 137 is attached to lever 135 and actuates clutch 138 (Fig. 3) through which motion is transmitted from gear 120 to shaft 121 for the ultimate oscillation of dogs 111 through the motion transmitting connections already described. The arrangement is such that when the dogs are lifted through the oscillation of bar 130 and hand lever 135 the clutch at 138 is disconnected to prevent unnecessary movement of the connections for actuating the dogs. The arrangement is also such that this clutch re-engages before the dogs reach a position for engagement with ratchet wheel 110.

An arm 139 (Fig. 11) projects upwardly from cross shaft 136 and serves to operate an interlocking device which will hereinafter be described. It performs the further function of latching lever 135 and arm 130 in the extreme positions of these parts. An ordinary spring stop latch at 140 engages arm 139 frictionally in the extreme positions thereof and tends to retain the arm in either of such positions.

In addition to the means for manually lifting bar 130 through the employment of hand lever 135 to lift dogs 111 from ratchet wheel 110, two separate devices are supplied for automatically lifting bar 130 for this purpose. A pin 150 projects laterally from bar 130 and, as best shown in Figure 4, extends across the arm 151 of rock shaft 152 and also across the portion 153 of the sliding yoke 154. This yoke comprises a generally rectangular frame which is mounted to slide horizontally and is provided with an arm 155 having fingers 156 and 157 engaged about the hand lever 158 by means of which the reversing clutch 96 is shifted (Fig. 3). Bar 153 of the frame or yoke 154 is provided at 159 with a cam surface formed as indicated in Figure 12 to interact with pin 150 so that when the frame or yoke 154 is forced rearwardly the portion of cam surface 159 will be such as to lift the curved bar 130 and raise dogs 111. It is obvious that this action will occur whether or not the dogs are already raised and the obvious purpose of this arrangement is to provide an interlock such as to make it impossible for the dogs to act upon ratchet wheel 110 at such times as clutch 96 is engaged with pinion 99 to rotate ratchet wheel 110 and parts connected therewith in a direction opposite to that in which such wheel and parts would be operated by the dogs.

Clutch disengaging striker controlling step by step or ratchet feed motion

Reference has already been made to the arm 151 which is mounted upon the rock shaft 152 which takes the form of a sleeve. Through this rock shaft is transmitted the power which lifts the dogs 111 during normal machine operation. Rock shaft 152 carries a finger 160 which is disposed parallel to the plane in which bevel gear 97 rotates and in close proximity to such gear. Upon the gear is mounted a striker member which is duplicated in other parts of the machine. The purpose of the striker member is to permit a limited degree of rotation to the parts controlled thereby and subsequently to disengage a clutch or equivalent means to permit such parts to stop. The structure of this particular striker member is so organized as to permit more than 360 degrees of rotation of the parts controlled thereby. Of such devices as employed in this machine, the striker member 165 which acts upon finger or rock arm 160 is representative, and consequently it will be described in detail.

Referring particularly to Figure 13 the gear 97 may be understood to be rotating in the direction indicated by the arrow. This gear may rotate in either direction and in either direction will lift rock arm 160, but it is only in one direction of gear 97 that the lifting of such rock arm is significant.

The device 165 includes a rotor 170 which is supported for limited oscillatory movement with reference to the shaft 18 with which gear 97 is connected. The degree of oscillation of rotor 170 with reference to the shaft and gear is limited by a fixed pin 171 projecting from the face of the gear and by an adjustable stop 172 which is slotted and secured in position with reference to the face of the gear by means of a screw 173 extending through the slot or stop member 172 and threaded to the gear. The rotor 170 is provided with a radial arm 174, with a striker head 175 which is adapted to impinge upon the cam surface 176 of rock arm lever 160. The arm 174 strikes the stop comprising pin 171 on the one hand and stop member 172 on the other. The entire rotor is normally held to a position such that arm 174 abuts pin 171. This may be done by means of a tension spring 178 anchored at 179 to gear 97.

The spring 178 is comparatively light and if the parts be assumed to be rotating in the direction indicated by the arrow from the starting point represented by the full line position of rotor arm 174, it will be obvious that in slightly less than 360 degrees of rotation the striker roller 175 will contact with the cam surface 176 of rock arm 160. The resistance of the rock arm will be more than sufficient to counteract the tension of spring 178. As a consequence the entire rotor will be held stationary through its contact with cam surfaces 176 while the gear 97 continues to rotate in the direction indicated by the arrow. This relative rotation between the gear and the rotor will continue until the adjustable stop 172 reaches the rotor, the parts then being in the dotted line positions indicated in Figure 13. The motion of the gear will now be transmitted positively through adjustable member 172 to the rotor arm 174 and rock arm 160 will be lifted to permit the rotor to pass.

As soon as the rotor is relieved of the detaining effect of rock arm 160 the spring 178 will act to advance the rotor with reference to gear 97 whereby to restore the rotor to its original position with reference to pin 171. In the meantime, the oscillation of arm 160 and sleeve 152 will have resulted as aforesaid in lifting dogs 111 from the ratchet wheel 110 and at the same time in throwing out the clutch at 138 and permitting the ratchet wheel to come to rest. It will be obvious that the extent of movement which is permitted to the rotor 170 whereby it lags angularly behind gear 97 will represent a movement of such gear in excess of 360 degrees from its starting point before mechanism is automatically tripped to bring the gear to rest. Other similar striker or tripping devices which are used in this machine will all be designated in their entirety by reference character 165 although they may differ in proportions or in their specific details from that already described.

It will, of course, be noted that in the event that gear 97 is rotating counter-clockwise as shown in Figure 13 there will be no relative movement of rotor 170 with reference to such gear due to the fact that the rotor is already impinging stop pin 171 and the first contact of roller 175 with the cam surface 176 will lift rock arm 160. At such times, however, the bar 130 which lifts dogs 111 from engagement will ordinarily be already in its elevated position so that this oscillation of arm 160 will be without effect.

*Operating connections for reversing lever 158*

Reference has already been made to the fact that clutch 96 is operated by means of a shifting lever 158 to engage shaft 32 alternatively with either of the bevel pinions 98 and 99 to rotate shafts 18 and 15 selectively in either desired direction of rotation. The lever 158 may be manually operated either by direct engagement thereof or through the medium of the rock shaft 180 to which such lever is connected and to which is also connected the hand lever 181 and a treadle 182, the latter being linked to shaft 180 by means of a link 183 and an arm 184 projecting from such shaft. This arrangement makes it possible for the operator to shift clutch 96 manually from two different points in the machine or, if he should be busy at some other task with his hands, he may shift the clutch by rocking treadle 182 with his foot.

In addition to these different ways in which the operator may control clutch 96, there are also several ways in which such clutch may be controlled automatically. These will now be described.

Keyed to the main shaft 15 of the machine is a sleeve 184 carrying a disk 185 (Figs. 3 and 14) which is provided upon one side with a striker device 165 corresponding to that already disclosed and supported for a limited degree of oscillation with respect to sleeve 184 and disk 185. The striker head 175 of the device just mentioned is adapted to act upon an adjustable trip element 186 having an abrupt shoulder at 187 and connected by means of screws 188 to the link member 189 supported for a slight oscillatory movement with reference to its pivotal connection at 190 with the handle 158.

Link member 189 is cut away at 191 and adjacent this cam-like cut the link passes through the yoke or frame 195 (Figs 14 to 18, inclusive) within which is mounted a pivotal support 196 fulcrumed with reference to the frame at 197 and normally maintained in contact with the stop 198 by means of a tension spring 199.

The arrangement is such that when the pivoted support 196 is upright and in contact with stop 198, the link 189 will be held at such an elevation that shoulder 187 will clear the striker head 175. In Figure 14 the lever 158 is illustrated in its neutral position, and it will be obvious that if it is pushed counter-clockwise as viewed in Figure 14 to shift frame 154 and thereby engage clutch 96 with pinion 99, link 189 will slide across the top of pivoted support 196 and will be maintained at such an elevation that the striker device 165 will be inoperative with reference thereto. This is necessary for the reason that when the clutch 96 is engaged with pinion 99 disk 185 will have a clockwise rotation.

If, however, the handle 158 is oscillated in a clockwise direction or to the right so that it assumes the position in which it is illustrated in Figure 15 the inclined cam portion 191 of link 189 will co-operate with the support 196 to the end that the link will be lowered to the position in which it is shown in Figure 15. In such position the shoulder 187 is disposed in the path of striker head 175. The disk 185 is now being rotated in a counter-clockwise direction due to the engagement of clutch 96 with pinion 98. It will be obvious that when pin 200 limits the free movement of striker head 175 with reference to disk 185 the result will be a positive actuation of hand lever 158 to its neutral position whereby the clutch 96 is disengaged and motion of the parts controlled thereby ceases.

The restoration of the handle 158 to its neutral position results in oscillating the pivotal support 196 to the position indicated by dotted lines in Figure 15 whereby spring 199 is subjected to increased tension. As soon, however, as clutch 96 is disengaged and the rotation of disk 185 ceases, the frictional engagement of striker head 175 with shouldered portion 187 of link 189 will be relieved and only under such circumstances will the increased tension of spring 199 be adequate to restore to an upright position the pivotal support 196. In moving toward such position the support will interact with the cam surface 191 of the link to lift the link again to horizontal whereupon the shoulder 187 will again be out of the path of rotation of striker head 175.

*Interlocking control of levers 135 and 158*

An interlocking feature may now be described, the purpose of which is to prevent an accidental shifting of clutch 96 during step rotation of the work. It will be recollected that with reference to the disclosure in connection with Figure 11 and the hand lever 135 for the engagement of dogs 111, mention was made of an upstanding arm 139 engaged by a spring detent 140. The arm 139 is connected by a link 205 with the short arm 206 on a rock shaft 207 sustained longitudinally of the main axis of the machine. Returning now to Figure 14 it will be observed that a finger 208 is carried at the end of rock shaft 207 and is disposed when elevated to lift the end of the oscillatory link 189 whereby to render striker device 165 upon disk 185 inoperative for the shifting of clutch lever 158. Thus, the said oscillatory link 189 may not only be lifted due to the clock-wise rotation of disk 185 but may also be lifted by finger 208 if lever 135 is operated in a direction such as to lower the dogs 111 to their operative positions.

The mere lifting of link 189 effects no interlock but it will be noted that the length of finger 208 is such that element 186 will contact therewith if an attempt is made to shift lever 158 counter-clockwise when the finger 208 is elevated. If the finger 208 is lowered to the position indicated in Figure 15 (as is always the case when hand lever 135 is in its dotted line position in Figure 11) lever 158 will be free to move counter-clockwise as viewed in Figures 14 and 15 for the engagement of clutch 96 with pinion 99. The obvious purpose of this interlocking feature is to prevent clutch 96 from being engaged with pinion 99 so as to rotate shaft 15 in one direction when the dogs 111 are operative to rotate such shaft in the other direction.

Figures 16 and 17 show the opposite side of disk 185 from that which appears in Figures 14 and 15. No such yieldable striker device as that indicated at 165 is employed on this side of the disk. In place thereof a single strike pin 210 is mounted in a fixed position to project from the face of the disk. This strike pin is fixed for the reason that it has for its function the stopping of rotation in the main shaft 15 and related parts at a definite predetermined position.

*Knock out fingers to shift reversing lever 158 to neutral position*

A link 212 is pivoted to hand lever 158 and extends therefrom in parallelism with link 189. It passes through a separate slot in the same yoke or frame 195 and is disposed upon the side of disk 185 upon which said disk carries pin 210. The links 189 and 212 are similar in function but operate to adjust clutch shaft lever 158 in opposite directions. They are sometimes called knock-out fingers due to their action in clutch disengagement.

Link 212 is shouldered at 213 for engagement by the strike pin 210. The link is provided with an inclined surface at 214 and is normally carried by pivoted support 215 out of the path of pin 210. A tension spring 216 holds the pivoted support 215 normally in contact with the stop 217. These parts correspond in function to the pivoted support 196 and related parts although it will be noted that the two supports are oscillatory in opposite directions from their respective stops. It will be obvious that when hand lever 158 is shifted to the left as viewed in Figure 15 as for the engagement of clutch 96 with pinion 98 the link 212 will be maintained by support 215 in an elevated position whereby the shoulder 213 is kept out of the path of rotation of pin 210. If, however, handle 158 is moved to the right as viewed in Figure 17, the passage of the inclined surface 214 across the end of support 215 will permit link or knock-out finger 212 to drop until its shoulder 213 is in a position to be struck by the pin 210. The encounter of the pin with the shoulder 213 will always result in the stopping of shaft 15 and rotary parts carried thereby in a certain predetermined position from which the veneer winding operation may be started.

When the lever 158 is restored to neutral through the encounter of shoulder 213 and pin 210, the pivoted support 215 will be swung to the left to its dotted line position in Figure 16 thereby putting under tension the spring 216 connected with this support. As soon as the clutch is disengaged, the resulting relief of pressure on the shoulder will permit the spring to restore the support and the link 212 to their original positions.

*Automatic reverse during work retraction*

In addition to the automatic means already described for throwing clutch lever 158 to its neutral position to disengage clutch element 96 from either of the pinions 98 and 99 with which it may happen to be connected, there is further means provided which operates at the proper time to engage clutch element 96 with pinion 99. This mechanism will now be described.

Reference has hitherto been made to the slide 50 which is actuated by means of connecting rod 51 for the purpose of adjusting the drum 9 between its advanced and retracted positions. An arm 220 (Figs. 4 and 35) which is connected with this slide rigidly for movement therewith is provided at its end with a cam finger 221 inclined at about 45 degrees with reference to the direction of movement of slide 50 and said arm. The operative portion 220 of this cam finger depends from the adjacent portions of the arm.

In pivotal connection at 223 with the clutch actuating slide of frame 154 is a complementary cam member 225 which is pulled by a tension spring 226 into abutment with the shoulder 227. A strike plate 230 projects upwardly from member 225 and is disposed at an angle of approximately 45 degrees with reference to the path of movement of the slide or frame 154 which actuates clutch element 96. The plate 230 provides upon its opposite sides bearing surfaces with which the depending portion 221 of cam finger 220 is adapted to interact. The arrangement is such that when the slide 50 moves toward the left as viewed from the front of the machine to advance the drum 9 to its operative position the cam 221 will interact with member 225 in a direction to oscillate member 225 about its pivot at point 223. The extent of such oscillation will be sufficient to permit arm 221 to pass without transmitting any movement to the sliding frame 154. The tension of spring 226 will restore member 225 to its original position as soon as cam 221 has passed. Upon the return movement of the cam when the block 9 is being retracted the cam will strike the opposite face of plate 230 in a direction such that member 225 will abut shoulder 227 and will be restrained thereby against oscillation. The continued movement of the cam will result in forcing the entire sliding frame 154 rearwardly whereby to engage clutch element 96 with pinion 99.

As will hereinafter be explained more fully the retraction of drum 9 represents one of the final movements in the box forming operation and it is advantageous therefore to utilize such retraction to restore the rotating parts of the machine including shaft 15, drum 9, and chuck disk 8 to their original rotative positions whereby to facilitate the initial operations incident to forming the next box. The engagement of clutch 96 under the circumstances above mentioned involves the automatic movement of hand lever 158 which is adjusted in accordance with the movement of slide 154 toward the position indicated in Figure 4. The link or knock-out finger 212 is accordingly dropped to receive the impact of pin 210 and this arrangement is such that the automatically commenced rotation of shaft 15 will have a duration only sufficient to raise pin 210 to a point where it will interact with link 212 to throw out the clutch again and permit the parts to come to rest.

To guide and confine the sliding frame 154 for the movement just described it is convenient to provide at 232 a frame extension having a laterally projecting arm 233 which provides a seat at 234 for the adjacent portion of the sliding frame 154. This portion of the frame or yoke 154 is slotted at 235 to receive a guide pin 236 projecting upwardly from the seat 234. An over-hanging plate 237 (Fig. 35) is fastened to the stationary frame element 233 and holds the slotted portion of the sliding frame or yoke 154 to the seat.

*Work clamping mechanism*

I will now describe the construction of drum 9 reference being made for that purpose to Figures 22 to 27 inclusive.

In my former patent above referred to I employ a pressure bar for the purpose of holding the veneer or side wall material of the box to the box bottom and to the drum or mandrel. Such a bar is shown at 240 and is mounted on lever 241 (see Fig. 19) which is fulcrumed on shaft 242 and is oscillated by an adjustable link 243 which is connected to the pedal 244 (Figs. 2, 19 and 26). A spring 245 (Fig. 19) keeps the pedal and the pressure bar normally lifted. When the pedal is depressed the pressure bar 240 is likewise depressed. It may be added at this point that pedal 244 is overlapped marginally by pedal 182. The latter pedal when depressed is adapted to shift clutch lever 158 to engage clutch 96 with pinion 98, whereby to rotate the drum in a veneer winding direction. Thus, through pedal 244 the pressure bar may be forced in the direction of the drum without starting the rotation of the drum, whereas if pedal 182 is depressed it carries with it pedal 244 whereby to lower the pressure bar and simultaneously to set the drum into rotation.

In the present machine means is provided to utilize the initial movement of the pressure bar for locking the veneer or side wall material of the box to the drum 9 for rotation therewith. The arrangement whereby the veneer may be engaged and disengaged by the drum as desired will now be described.

The drum 9 comprises a hollow cylindrical member provided internally with hubs 247 and 248 screwed to sleeve 280 which is in splined relation to the main shaft 15 of the machine. From these hubs webs or spokes 249 support the drum-like wall of the drum proper. The drum is not formed as a true cylinder but has a longitudinally extending opening at 250. A peripheral continuation element 251 is hinged to the outside wall of the drum at 252 as is clearly shown in Figure 24. The hinged element 251 is normally forced outwardly by a compression spring 253 which may comprise a strip of spring metal bent to the proper shape and spanning the hinge 252. A jaw member 255 extends from the hinged peripheral panel element 251 beyond the margin 256 of the drum, the latter comprising a complementary jaw. Between these jaws the strip of veneer material designated at 257 may readily be received.

Guided for radial movement at the end of the drum by the strap shown in Figure 24 is a sector member 260 in pivoted connection at 261 with a lever 262 which normally lies upon the chord of the drum near the shaft 15. This lever is keyed to the rock shaft 263 mounted on the side of the end support 249, disposed within the drum and carrying the cam 264 (Fig. 25). A lobe portion 265 of this cam is adapted to interact, upon rotation of shaft 263, with the lever 266 which is fulcrumed at 267 to a boss appearing in Figure 25 adjacent to the periphery of the drum and is apertured at 268 to receive a rod 269. This rod is suitably guided in the sleeve 270 supported in the interior of the drum. The rod carries a wing nut adjustably secured to its end at 272. A compression spring 273 is confined between the wing nut and the apertured end of lever 266 whereby to transmit yieldably to rod 269 the pressure exerted upon lever 266 by the lobe 265 of cam 264. A second wing nut may be threaded to rod 269 at 274 to limit the movement of said rod responsive to the compression of spring 273.

Rod 269 is pivotally connected at 275 to the small bracket 276 which is attached to the hinged portion 251 of the drum and serves to transmit thereto the movement received as aforesaid. It is particularly to be noted that when the cam is rotated to the position in which it is shown in Figure 25 its line of pressure coincides with the shortest distance between lever 266 and the axis upon which such cam rotates. As a result it is merely necessary to depress sector 260 for a distance sufficient to oscillate the cam to the indicated position and thereupon the several parts become locked to maintain jaw 255 under the full compressive force of spring 273. There is no tendency for the cam 264 to be rotated toward its original position for the reason that the reaction of the spring is transmitted through the cam in the direction of the greatest radius of the cam.

The arrangement just described is such that the pressure bar 240 in its initial downward movement contacts with the upper surface of the reciprocable sector shaft member 260 and thereby locks the jaws 255 and 256 in resilient clamping relation upon the interposed strip of veneer 257. The jaws once locked maintain their clamping engagement of the veneer until they are subsequently released through the operation of mechanism which will now be described.

Drum release mechanism

Between the hub 248 of the drum and shaft 15 is interposed a sleeve 280 which extends axially along the shaft and is threaded at 281 to receive the limiting nut 282. A spool 285 having one radial flange 286 and one flange 287 with a conical surface is mounted upon sleeve 280 for reciprocation thereon. The lever 262 through which the pressure bar 240 acts to operate the clamping jaws and which is directly connected with cam 264 for the oscillation thereof is provided at 290 with a bevel surface complementary to the angular deviation of the cam shaft flange 289 from the axis of spool 285. When lever 262 is forced downwardly to oscillate cam 265 to locking position the interaction between the bevel surface 290 of such lever and the flange 289 of the spool is such as to force spool 285 axially into contact with the end of the drum frame.

Spool 285 is engaged intermediate the flanges thereof by means of the shifting fork 292 (Fig. 26) which projects laterally from a portion of slide 50, thus the movement of the slide is transferred to the drum only through the movable spool 285. When the slide moves in the direction to retract the drum its initial movement results only in drawing the spool 285 in the direction of limiting nut 282. This movement, however, is sufficient to force the lever 262 radially outwardly, whereby to oscillate cam 264 to a position where it will release jaw 255 from pressure. At this point the contact of the spool with limiting nut 282 transmits the movement of the slide through such nut and spool 280 to the drum. It will be seen, therefore, that the moving jaw 255 is clamped automatically during the initial movement of the pressure bar 240 in the direction of the work and is released automatically just prior to the time when the block or drum is retracted from the finished box.

The cut-off saw shown at 295 (Figs. 1, 2 and 3) may be operated through a push bar 296 (Fig. 1) by means of mechanism substantially identical with that disclosed in my prior patent above referred to. It is not thought necessary to discuss the saw in detail herein.

A nailing machine mounted on the column designated generally by reference character 297 (Fig. 1) may also correspond with that previously described and need not further be discussed herein. Likewise hand lever 298, beveled gear 299 and gear wheel 16' on the same shaft, the latter being in mesh with gear wheel 16 for manually adjusting rotatively the drum 9 and flange 8 were described in my former patent.

I have, however, provided a novel and improved mounting for the standard stapling machine, the latter being designated in its entirety by reference character 300 (Figs. 1 and 19). Power for the operation of the stapling machine is derived from a sprocket 301 on shaft 92, (Figs. 2 and 3). A link 302 is pivoted concentrically with shaft 92 and is pivotally connected at 303 with a similar link 304 which is pivoted concentrically with sprocket 305 to the frame of the stapling machine 300. Idler sprockets 306 and 307 are connected respectively by chains 308 and 309 with sprockets 305 and 301 whereby to maintain continuous drive to sprocket 305 irrespective of the position of adjustment of the frame of stapling machine 300. From the continuously rotating sprocket 305 power is derived not only for the actuation of the stapling mechanism but also for the bodily adjustment of the stapling machine frame longitudinally on the box making machine. The means by which this adjustment is effected comprises a part of the present invention and will now be described in detail.

*Actuating mechanism for stapling machine carrier*

The stapling machine frame is supported in part by a wheel 310 which runs upon a track 311 carried by bracket 312 from the frame of the box machine. Pivoted to bracket 312 is an arm 313 which carries a member 314 which is preferably surfaced at 315 with brake lining, leather or the like. A hanger 316 pivoted to stop member 330 at 342 (Fig. 21) has a projecting stud 317 upon which is a roller 318 engaging the under side of member 314, the arrangement being such that the hanger may be raised and lowered to affect a corresponding adjustment of the member 314 about its pivotal connection with bracket 312. The flange wheel 417 directly connected with sprocket 305 is adapted to contact with the surfacing 315 of member 314 when the member is elevated. The pressure of roller 318 on the under side of the member is such as to insure an adequate degree of friction between wheel 417 and the surfacing 315 so as to propel toward the column the entire stapling machine. When the pressure of roller 318 is released, member 314 drops out of contact with the roll thereby allowing the bodily movement of the mechanism to cease.

For transmitting movement to the mechanism in the opposite direction I employ a rack 320 (see Figs. 1 and 20) supported as indicated in Figure 19 for oscillatory adjustment. A worm 325 is suitably journaled in the frame of the stapling machine immediately above the rack and in a position to mesh therewith when the rack is oscillated upwardly. The worm receives power through bevel gearing at 326 (Fig. 20) which connect it with a drive shaft 327 for the stapling mechanism. Rotation of the drive shaft is controlled through a so-called Morgan clutch disposed at 328, this clutch being of the type already disclosed herein, and controlled by means of the trip 329 and the stop 330 (Fig. 21). The arrangement is such that when the stop is withdrawn from the path of the trip the clutch engages automatically and remains in engagement until the stop is again interposed in the path of the trip.

From the foregoing, it will be obvious that whenever the driving shaft 327 is operative through the engagement of clutch 328, the worm 325 is also in operation so that when the rack 320 is oscillated upwardly into mesh with the worm a feeding operation in accordance with the pitch of the worm will occur.

It is, of course, undesirable to have a continuous feed for the translation of the stapling machine. The stapling machine should be allowed to come to rest during the driving and clenching of each staple and should be advanced only intermediate the stapling, driving, and clenching operations. For this reason the worm 325 is preferably of a peculiar construction in that its thread has a pitch for a circumferential extent of considerably less than 360 degrees. The portion of the worm thread which has a pitch is indicated at 335 in Figure 22 and it will be noted that the entire portion 336 of the worm thread is disposed wholly in a plane normal to the axis of the worm. This last mentioned portion of the worm thread could be wholly omitted so far as the feeding operation is concerned but it has a valuable function in that it maintains the worm in positive mesh with the rack for the full 360 degrees of worm rotation. The plane in which portion 336 of the worm thread is disposed is such as to insure that the stapling mechanism will not only be permitted to remain stationary but actually insures, through its interlocking engagement between two teeth of the rack, that the stapling mechanism must remain stationary. The worm is so designed and is driven at such a speed from shaft 327 that the period for which it remains stationary corresponds to the period required for the stapling operation of the standard machine designated at 300. That portion of the worm thread shown at 335 has such a pitch and extent as to advance the stapling machine for the desired distance between operations thereof.

The advance of the stapling machine in either direction and the function thereof are controlled by a single handle 340 mounted upon the end of a rock shaft 341 (Figs. 19 and 21). The rocker stop arm 330 which releases clutch 328 may be directly connected with rock shaft 341 as indicated in Figure 21, and the hanger 316 which carries roller 318 may be pivotally connected at 342 to the stop member 330. It will be obvious that the upward oscillation of the operative portion of stop member 330 will not operate to release the dog 329 of the clutch but will operate to lift member 314 for contact with the flange wheel 317, thereby the stapling mechanism will be bodily adjusted over the column.

When the stapling mechanism is moved the desired distance toward the column, it is only necessary to oscillate handle 340 in an opposite direction whereby roller 318 will be dropped to lower member 314 and the stop 330 will be oscillated to a position where lug 329 will clear it and will permit the automatic engagement of the Morgan clutch at 328. Thereby, the stapling mechanism will be set in operation and simultaneously the worm 325 will commence to rotate. Handle shaft 341 also carries arm 345 which is connected by a link 346 with the rack member 320. Thus, simultaneously with the commencement of rotation of the shaft 327 and worm 325 the rack member 320 will be lifted into mesh with the worm and the worm will be operative to advance the stapling mechanism intermittently in accordance with the stapling operation as previously described.

I have now described all of the different individual parts of the machine somewhat in the order in which they are used in practice although it will be obvious that certain parts of the mechanism are used more than once and that therefore it has not been possible to adhere strictly to the order of use. By way of summary, however, the several operations which the machine is capable of performing will now be described for the purpose of correlating the different portions of the machine and the functions performed by each.

The bottom of the box is formed from a blank which may be assembled as disclosed in my copending application Serial No. 556,674, filing date April 26, 1922. A typical blank of this sort is shown at 350 (Figure 29). This blank is supported temporarily on a positioning member 351 such as that disclosed in my former patent. Connections at 352 a fragment of which appears in Figure 1 extend through the machine to an eccentric strap 353 which is operatively engaged on eccentric 354 on shaft 25 whereby the rotation of shaft 25 will result in drawing the support 351 out of the way. These features are disclosed in said former application and are not claimed herein. Further illustration is therefore deemed unnecessary.

The blank being thus supported between chuck disks 7 and 8 the operator kicks pedal 780 which releases trip 35 and permits the Morgan clutch shown at 33 to engage sprocket 30 with shaft 26. Shaft 26 makes one complete rotation whereupon this clutch is automatically disengaged and the shaft comes to rest. This rotation is transmitted to produce one-half a rotation of shaft 25 whereby crank 24 is thrown 180 degrees to advance flange 8 to the position for engaging the blank 350. The chuck disks 7 and 8 are preferably of a construction disclosed by me in a co-pending companion application referred to above so that irrespective of the care with which the blank 350 has been constructed it will receive adequate support and engagement by the radially and annularly projecting prongs of the flanges.

The operator now pushes either of handles 158 or 181 away from him toward the center of the machine whereby to engage clutch 96 with pinion 99 and to rotate shaft 15 and the chuck disks 7 and 8 with blank 350 engaged therebetween. Simultaneously the operator presses upon member 296 to force saw 295 into operative relation with blank 350 so that when such blank commences to rotate it will be trimmed to circular form to comprise the box bottom 451 as shown in Figure 30. Pin 210 more particularly described with reference to Figures 16 and 17 will automatically throw out clutch 96 after the blank has made its complete rotation. The clutch will be thrown out at such a point as to leave the jaw portions 255 and 256 of the drum or block uppermost. The saw returns itself automatically to the retracted position when pressure on member 296 is relieved.

The drum 9 is then advanced to an operative position with respect to the blank. The drum is of substantially equal diameter to the blank and is supported immediately adjacent thereto. Drum advance is effected by manipulation of handle 70 which releases Morgan clutch 59 thereby causing shaft 57 to make one complete rotation and to impart to crank 53 180 degrees of movement. Thereby the drum 9 is adjusted by means of slide 50 into operative proximity to the newly formed blank. As previously indicated jaw portions of the drum are uppermost.

It is particularly to be remembered that the interlocking features above disclosed prevent the release of either of the clutches 59 or 33 in such a manner as might cause injury to the drum or movable flange.

The side of the box is preferably formed by superimposing two thin sheets of veneer indicated at 452 or in lieu thereof a single relatively thicker sheet 453 may be employed. The side material is introduced between jaws 255 and 256 of the drum and the operator then exercises pressure upon treadle 182. The downward movement of treadle 182 is transmitted to treadle 244 which lowers pressure member 240 and, through the mechanism already described, locks jaw 255 in operative clamping relation to the side material 257, which may comprise either the individual strips 452 or the single strip 453. Simultaneously the clutch 96 is engaged with pinion 98 to rotate drums 9 in a direction to wind the side material about the drum and the bottom 451. The tripping device more particularly described in connection with Figures 14 to 17 inclusive operates to release clutch 96 after the drum has rotated 360 degrees plus the desired extent of overlap shown at 354 between the ends of the side material.

Two narrow strips of veneer indicated at 355 are preferably used to form the hoop about the bottom of the box. As soon as the winding operation has been completed as aforesaid the ends of these strips 355 are pressed underneath the overlapping portion of side material 257 and the operator immediately grasps handle 340 and oscillates it counter-clockwise to lift the track 314 into engagement with driving wheel 317 whereby the stapler is advanced toward the column of the machine in a position for use. As soon as the stapler reaches the desired position handle 340 is oscillated counter-clockwise and this operation, through the mechanism above described, results in starting the stapling mechanism in operation and in lifting rack 320 into mesh with the peculiar worm 325 whereby the stapling mechanism is intermittently advanced and permitted to dwell during the driving and clenching of each staple. The staplers 356 secure together the ends of the side material 257 being driven through such material and clenched against the metal block or mandrel 9.

As soon as the hoop material 355 has been introduced and the side of the box stapled as aforesaid and as indicated in Figure 32 of the drawings the operator throws lever 135 to engage clutch 138 and to lower dogs 111 into contact with ratchet wheel 110. As indicated in the prior patent above referred to, the same connection which actuates the ratchet feed also serves to operate the nailing machine.

The ratchet feed serves to rotate the unfinished box in a winding direction and the pressure bar 240 holds the hoop material to the box while the nails are driven thereto. As is clearly shown in Figure 34 of the drawings, the nails are driven through the hoop material into the bottom 351 at intervals determined by the degree of oscillation of dogs 111. Of course, the nails 357 are driven during the dwell which results from the dogs oscillating rearwardly to a new point of engagement with the ratchet wheel 110. The action of dogs 111 to rotate the box continues to produce a complete rotation of the box and in addition a sufficient rotation to take care of the overlap of the hoop material as indicated at 358. The action of the dog is stopped automatically as above indicated by the mechanism which is shown in detail in Figure 14 and which permits the ratchet to act throughout one complete rotation and a part of another. The nailing operation completes the box which may now be removed from the machine.

The first step in removing the box consists in the withdrawal of drum 9 from within the box. This is accomplished by actuating handle 70 at the front of the machine to release the Morgan clutch at 59 whereby crank 53 is drawn 180 degrees to the original position, thus withdrawing the drum from the box. As already indicated the initial movement of slide 50 which retracts the drum serves to unlock the jaws which have been clamping the side material 257 of the box and thereafter the drum is free to slide axially from within the box.

It will be remembered that during the process of forming the box the jaws have been caused to rotate in a winding direction to make a complete rotation plus the overlap of the side material 257 and other complete rotation from that point, and plus the overlap of the hoop material 355. This has brought the clamping jaws of the drum well around toward the back of the machine and it is necessary to restore the drum and such jaws to operative position with the jaws at the top of the drum in readiness for the next winding operation. This result is obtained by mechanism which is set in motion by the retractive movement of the slide 50 as heretofore described and operates to engage clutch 96 momentarily with pinion 99. The clutch is automatically disengaged after a fractional rotation of shaft 15 through the medium of the mechanism shown in detail in Figure 4.

After the drum has been retracted it is only necessary for the operator to withdraw chuck disk 8 from the box and this is done by the foot pedal 78 which releases Morgan clutch 33 to permit crank 44 to rotate 180 degrees whereby to pull shaft 15 and chuck disk 8 axially toward the right-hand side of the machine whereupon the box is released and the support 351 is adjusted back to a position where it may receive operatively the next blank 350. The completion of this sequence of operations restores the machine to a condition for the next similar sequence.

It will be noted particularly that while the machine is completely under the manual control of the operator as far as the initiation of mechanical operations is concerned, nevertheless there is no reason why the operator is required to work slowly and carefully. Regardless of the rapidity with which he goes through the sequence of operations, the various levers and pedals which he is called upon to actuate are so interlocked as to prevent the possibility of damage or breakage to the mechanism through the operation of a control member at times such that conflict between mechanically actuated parts would result. Also practically all operations are mechanically concluded. This makes possible an extremely rapid rate of box production.

A great saving of time and material is also effected by the improved box making method whereby the box side material is positioned by the jaws of the drum until the hoop material is wound in place, so that the nails simultaneously secure the side and hoop material to the box bottom blank.

I claim:

1. In a box making machine, the combination with an independently adjustable bottom clamping flange and side supporting drum, of mechanisms provided with manually controlled trips and adapted when released by said trips to produce independent uni-directional axial movement in said flange and said drum respectively and come to rest upon the completion of each such movement, of an interlock operative between said trips and adapted to secure one of said trips against release until the other trip has been released.

2. In a box making machine, the combination with an axially adjustable work supporting and winding drum, of a crank operatively connected therewith to move said drum axially between advanced and retracted positions, a clutch adapted for manual release to produce a predetermined degree of automatically stopped rotation of its driven element, driving connections connecting said clutch with said crank and so proportioned as to produce 180° of crank movement during the predetermined rotation of said clutch element, a bottom clamping flange having a similar clutch, connections and crank, and interlocking mechanism operated by one of said connections and adapted normally to render non-engageable the clutch controlling the other of said connections, said interlock being adapted to be adjusted by the set of connections by which it is operated, whereby to release for operation said other set of connections and to render said drum and flange independently adjustable in predetermined sequence only.

3. In a box making machine, the combination with a pair of bottom engaging and side supporting members independently adjustable and adapted to be advanced successively between adjacent retracted positions and adjacent advanced positions, of connections for the mechanical uni-directional actuation of said members between their respective advanced and retracted positions, and interlocking mechanism controlling the operation of said connections and adapted to prevent the movement of the more retracted member until the more advanced member has been moved to its advanced position.

4. In a box making machine, the combination with a pair of bottom engaging and side supporting members independently adjustable and adapted to be advanced successively between adjacent retracted positions and adjacent advanced positions, of connections for the mechanical uni-directional actuation of said members between their respective advanced and retracted positions, and interlocking mechanism controlling the operation of said connections and adapted to prevent the movement of the more retracted member until the more advanced member has been moved to its advanced position, said interlocking mechanism being also adapted to prevent the return of the more advanced member until the less advanced member has been returned to its retracted position.

5. In a box making machine, the combination with a pair of bottom engaging and side supporting members independently adjustable and adapted to be advanced successively between adjacent retracted positions and adjacent advanced positions, of connections for the mechanical uni-directional actuation of said members between their respective advanced and retracted positions, and interlocking mechanism controlling the operation of said connections and adapted to prevent the movement of the more retracted member until the more advanced member has been moved to its advanced position, said interlocking mechanism being also adapted to prevent the return of the more advanced member until the less advanced member has been returned to its retracted position, said actuating connections each including an automatically self stopping element adapted to be tripped manually and adapted upon successive occasions when so tripped to adjust said elements respectively in opposite directions between said positions.

6. In a box making machine, the combination with a main shaft, of a bottom-engaging flange carried thereby and supported for rotative and axial movement together with said shaft, a side supporting drum splined to the shaft for rotation and axial movement with respect thereto, separate cranks operatively connected respectively with the flange and the drum for the independent axial adjustment thereof, gearing in the ratio of one to two operatively connected to rotate said cranks, and independent driving connections for the smaller gears in each such set, said connections each including self stopping clutches adapted to be manually tripped to produce 360° of rotation of the connections in which such clutches are located, a manually adjustable trip for each such clutch, and interlocking mechanism operatively arranged to be actuated upon the movement of one set of connections and adapted to release for manual operation the trip of the clutch controlling the other set of connections, said interlocking mechanism being adapted to secure the last mentioned trip against release until so actuated.

7. In a box making machine, the combination with a rotary work support and driving connections including a clutch controlling the application of power thereto, clutch disengaging mechanism including a lever, spaced limiting members connected for rotation with said support, a strike element movable with reference to said limiting members and including a portion disposed in the path of said lever and adapted to contact said lever for the actuation thereof in a clutch disengaging direction, together with a spring acting upon said strike element and normally pressing it in the direction of rotation of said limiting member.

8. In a device of the character described, the combination with a winding drum supported for rotation and means for holding work operatively upon the drum, of a ratchet wheel, gearing connecting said wheel with said drum, a dog acting upon said wheel for the intermittent rotation of said drum, means for lifting said dog out of contact with said wheel, said means including an arm, a strike element normally movable in accordance with the rotation of said drum and supported for limited yielding movement, a stop positively limiting the yielding movement of said strike element with reference to said drum, and a spring normally supporting said strike element against said yielding movement, said strike element being adapted to contact said arm and to yield against the resilient opposition of said spring until it is contacted by said stop and thereupon positively to actuate said arm in a direction to lift said dog from said wheel, said yielding contact device being adapted when it meets said stop to stop the rotation of said drum after winding material thereon in excess of one revolution, whereby to produce an overlap of such material, and means operable to return the striker element and drum to their starting position of rotation, said striker element being restored by said spring to its original adjustment when free of said arm.

9. In a device of the character described, the combination with a work support supported for axial and rotative movement, of means for rotating said support in excess of one revolution, and means automatically operative upon the axial movement of said support in one direction for the rotation of said support to its original position.

10. In a device of the character described, the combination with a work support supported for axial and rotative movement, of means for rotating said support in excess of one revolution, and means automatically operative upon the axial movement of said support in one direction for the rotation of said support to its original position, said means being inoperative in the other direction of axial movement of said support.

11. In a device of the character described, the combination with a work support mounted for axial and rotative movement, of motion transmitting connections for the rotation of said support, an automatic stop adapted to disengage said connections when said support has made a complete rotation and a fractional rotation in addition thereto, and means operative upon the axial movement of said support for rotating said support to its original rotative position.

12. In a device of the character described, the combination with a work support mounted for axial and rotative movement, and means for transmitting rotative movement to said support comprising a sliding clutch element, of an actuating cam therefor movable axially with said support and transversely with respect to said clutch element, a complementary cam connected with said clutch element and adapted to receive motion from said first mentioned cam to shift said element, and means supporting one of said cams for yielding movement in one direction while supporting it against movement in the other, whereby to actuate said clutch in one direction of axial support movement only.

13. In a device of the character described, the combination with a work support mounted for axial and rotative movement and a pair of slidable members guided for movement in mutually transverse paths one of said members being connected with said support for axial movement therewith and the other of said members being operatively connected to control the rotation of said support, of a cam element connected with one of said members and a yieldable cam element connected with the other of said members, said element being formed to interact in one direction of relative movement of one of said members to transmit movement to the other of said members, a stop supporting said yieldable cam element to transmit such movement, and a spring urging said yieldable cam element toward said stop, said spring being adapted to permit said yieldable cam element to be displaced by said first mentioned cam element in one direction of movement of the member carrying said first mentioned element, whereby the rotation of said support will be controlled by its axial movement in one direction of axial movement only.

14. In a device of the character described, the combination with a work support mounted for axial and rotative movement, of driving connections including a clutch controlling the rotation of said support, a slide for the axial adjustment of said support, mechanism adapted to be acted upon by said slide to engage said clutch automatically upon the operation of said slide, and mechanism operative for the disengagement of said clutch when said support rotates to a predetermined position.

15. In a device of the character described, the combination with a rotatable work support mounted for axial and rotative movement, of means for adjusting said support axially in an advanced direction, means for rotating said support to a position representing a revolution and a predetermined fraction of a revolution, means for axially adjusting said support in a reverse direction, and means for automatically rotating said support reversely to its original position and there bringing it to rest.

16. In a device of the character described, the combination with a rotatable work support having a work engaging jaw adapted in a given position of rotation of said support to receive work, of mechanical connections for the rotation of said support from said position and including a clutch, means including a lost motion trip device for disengaging said clutch when said support reaches a predetermined second position in excess of one revolution whereby to overlap material wound on said support, means for axially adjusting said support to withdraw it from such material, and means for subsequently restoring said support automatically to its original position.

17. In a device of the character described, the combination with a rotatable work support having a work engaging jaw adapted in a given position of rotation of said support to receive work, of mechanical connections for the rotation of said support from said position and including a clutch, means including a lost motion trip device for disengaging said clutch when said support reaches a predetermined second position in excess of one revolution whereby to overlap material wound on said support, means for axially adjusting said support to withdraw it from such material, and means for subsequently restoring said support automatically to its original position, said means including a clutch engaging member and clutch disengaging member and parts operatively connected with said members for the automatic actuation thereof, the parts acting upon the clutch disengaging member being movable in accordance with the rotation of said support toward its original position.

18. In a device of the character described, the combination with a drum mounted for rotation, of a strike element movable with the drum and yieldably mounted for a limited degree of lost motion and adapted to permit the overrun of said drum, actuating connections controlled by suitable clutch means and operatively arranged for the rotation of said drum and the movement of said element, said connections being clutch controlled for the actuation of said drum in a winding direction in excess of one revolution past the starting point to produce a predetermined degree of overlap of the work on said drum and in a reverse direction to the starting point, a clutch disengaging member adapted to be acted upon by said strike element to throw out a clutch when said drum is rotated reversely, a mechanically operated part, and means for transmitting movement from said part to a clutch in a direction to engage it for the reverse rotation of said drum.

19. The combination with a drum having a work engaging jaw and mounted for rotation from an original position in which work is receivable in said jaw, of clutch controlled connections for actuating said drum in either direction of rotation, means for the manual operation of a clutch controlling said connections, a plurality of clutch disengaging mechanisms each operative automatically to interrupt the transmission of motion to said drum after a rotation of said drum in excess of 360° in a given direction, whereby said drum may cease to rotate upon a plurality of different occasions with its said jaw successively removed from said original position, a reciprocable slide controlling a function of said machine, clutch engaging mechanism adapted to be actuated by said slide to transmit motion to said drum in a direction reverse to that aforesaid, and an additional clutch disengaging mechanism automatically operative to interrupt motion transmission to said drum when said drum rotates to its said original position.

20. The combination with a drum having a work engaging jaw and mounted for rotation from an original position in which work is receivable in said jaw, of clutch controlled connections for actuating said drum in either direction of rotation, means for the manual operation of a clutch controlling said connections, a plurality of clutch disengaging mechanisms each operative automatically to interrupt the transmission of motion to said drum after a rotation of said drum in excess of 360° in a given direction, whereby said drum may cease to rotate upon a plurality of different occasions with its said jaw successively removed from said original position, a reciprocable slide controlling a function of said machine, clutch engaging mechanism adapted to be actuated by said slide to transmit motion to said block in a direction reverse to that aforesaid, and an additional clutch disengaging mechanism automatically operative to interrupt motion transmission to said drum when said drum rotates to its said original position, said clutch engaging mechanism comprising a pair of cams adapted for interaction and connected respectively with said slide and with a clutch operated by said mechanism.

21. The combination with a drum having a work engaging jaw and mounted for rotation from an original position in which work is receivable in said jaw, of clutch controlled connections for actuating said drum in either direction of rotation, means for the manual operation of a clutch controlling said connections, a plurality of clutch disengaging mechanisms each operative automatically to interrupt the transmission of motion to said drum after a rotation of said drum in excess of 360° in a given direction, whereby said drum may cease to rotate upon a plurality of different occasions with its said jaw successively removed from said original position, a reciprocable slide controlling a function of said machine, clutch engaging mechanism adapted to be actuated by said slide to transmit motion to said drum in a direction reverse to that aforesaid, and an additional clutch disengaging mechanism automatically operative to interrupt motion transmission to said drum when said drum rotates to its said original position, said clutch engaging mechanism comprising a pair of cams adapted for interaction and connected respectively with said slide and with a clutch operated by said mechanism, one of said cams being yieldable in one direction and adapted to permit said slide to operate in one direction without transmitting movement to the clutch controlled by the interaction of said cams.

22. In a machine of the character described, the combination with a drum having a work engaging jaw adapted in a given position to receive the work, of a plurality of means for actuating said drum in a winding direction from said position, trip mechanism adapted automatically to interrupt each such means, one of said trip mechanisms being constructed to interrupt said means and permit the rotation of said drum to cease when said jaw is advanced in said winding direction of rotation more than a complete rotation from its original position, means for adjusting said drum axially, and means automatically operative upon the axial adjustment of said drum to restore said drum to its original position.

23. In a device of the character described, the combination with a drum mounted for rotative and axial movement and provided with a work engaging jaw adapted in an original position of said drum to receive work, connections operative for the rotation of said drum in a winding direction, means for the automatic interruption of motion transmission through said connections to said drum, said means being adapted to interrupt said transmission when said jaw is moved in a winding direction more than a complete rotation from its original position, motion transmitting connections adapted for the intermittent rotation of said drum in a winding direction, means automatically operative for interrupting motion transmission through said last mentioned connections, said means being adapted to interrupt such transmission when said drum has been intermittently rotated to a position more than one rotation remote from its original position, a reciprocable slide operatively connected with the drum for the axial adjustment thereof, motion transmitting connections for the operation of said block in a reverse direction, means automatically actuated upon the movement of said slide for rendering said connections operative to transmit reverse motion to said drum, and means automatically operative when said drum reaches its original position for interrupting motion transmission through said last mentioned connections, whereby to leave said jaw in a work receiving position following the movements aforesaid.

24. In a device of the character described, the combination with a rotatable and axially movable winding drum, having a predetermined position from which each winding operation commences, said drum being subject to manually and automatically initiated rotation of motion transmitting connections for the actuation of said drum, including a driving shaft and driven shaft, oppositely rotatable elements mounted upon the driving shaft, and a clutch shiftable to engage the driven shaft selectively with either of said elements; a clutch shifting member adapted for the manual adjustment of said clutch for engagement with either of said elements; strikers movable in accordance with the rotation of said drum; and contacts connected with said member for the actuation thereof and normally supported out of the paths of movement of said strikers, said contacts and their respective supports being formed for interaction controlled by the movement of said member to engage said clutch with either element, whereby upon the engagement of said clutch through the manual actuation of said member, one of said contacts will automatically move to a position to be engaged by one of said strikers in a direction for the disengagement of the clutch so engaged, said contacts and strikers being so disposed that irrespective of the direction of rotation of said block it will come to rest in said position.

25. In a device of the character described, the combination with a rotatable and axially movable winding drum having a predetermined position from which each winding operation commences, said block being subject to manually and automatically initiated rotation, of motion transmitting connections for the actuation of said drum, including a driving shaft and driven shaft, oppositely rotatable elements mounted upon the driving shaft, and a clutch shiftable to engage the driven shaft selectively with either of said elements; a clutch shifting member adapted for the manual adjustment of said clutch for engagement with either of said elements; strikers movable in accordance with the rotation of said drum; and contacts connected with said member for the actuation thereof and normally supported out of the paths of movement of said strikers, said contacts and their respective supports being formed for interaction controlled by the movement of said member to engage said clutch with either element, whereby upon the engagement of said clutch through the manual actuation of said member, one of said contacts will automatically move to a position to be engaged by one of said strikers in a direction for the disengagement of the clutch so engaged, together with means for the automatic engagement of said clutch with one of said elements, said contacts and strikers being so disposed that irrespective of the direction of rotation of said drum it will come to rest in said position whether its rotation is manually or automatically initiated.

26. In a device of the character described, the combination with a rotatable and axially movable winding drum having a predetermined position from which each winding operation commences, said block being subject to manually and automatically initiated rotation, of motion transmitting connections for the actuation of said drum, including a driving shaft and driven shaft, oppositely rotatable intergeared elements connected with the driving shaft, and a clutch shiftable to engage the driven shaft selectively with a plurality of said elements; a clutch shifting member adapted for the manual adjustment of said clutch for engagement with a plurality of said elements; strikers movable in accordance with the rotation of said drum; contacts connected with said member for the actuation thereof and normally supported out of the paths of movement of said strikers, said contacts and their respective supports being formed for interaction controlled by the movement of said member to engage said clutch with either element, whereby, upon the engagement of said clutch through the manual actuation of said member, one of said contacts will automatically move to a position to be engaged by one of said strikers in a direction for the disengagement of the clutch so engaged, together with means for the automatic engagement of said clutch and shifting member with one of said elements, said means and shifting member comprising a slide operatively connected with said block for the axial adjustment thereof; clutch controlled means for the operation of said slide; a cam connected with said slide; and a second cam connected with said member and said clutch and, formed for interaction with said first mentioned cam to adjust said member in a clutch engaging direction, said contacts being adapted to permit said drum to come to rest in said position irrespective of its direction of rotation and whether its rotation was initiated mechanically by said cams or manually by said member.

27. In a device of the character described, the combination with a rotatable and axially movable winding drum having a predetermined position from which each winding operation commences, said block being subject to manually and automatically initiated rotation, of motion transmitting connections for the actuation of said drum, including a driving shaft and driven shaft, oppositely rotatable intergeared elements connected with the driving shaft, and a clutch shiftable to engage the driven shaft selectively with a plurality of said elements; a clutch shifting member adapted for the manual adjustment of said clutch for engagement with a plurality of said elements; strikers movable in accordance with the rotation of said drum; and contacts connected with said member for the actuation thereof and normally supported out of the paths of movement of said strikers, said contacts and their respective supports being formed for interaction controlled by the movement of said member to engage said clutch with either element, whereby upon the engagement of said clutch through the manual actuation of said member, one of said contacts will automatically move to a position to be engaged by one of said strikers in a direction for the disengagement of the clutch so engaged, together with means for the automatic engagement of said clutch and shifting member with one of said elements including a set of cams adapted to be brought into cooperative relation at one stage of slide movement, one of said cams being yieldable upon contact with the other of said cams in one direction of slide movement and being fixed against yielding in another direction of slide movement, whereby to shift said clutch in one direction of slide movement only, said contacts and strikers being so disposed that irrespective of the direction of rotation of said drum it will come to rest in said position whether such rotation was initiated mechanically or manually.

28. In a device of the character described, the combination with a shaft supported for rotation, means for rotating said shaft and stopping it at a point of overrun beyond its starting point, of a drum splined to said shaft for rotative movement therewith and for axial work releasing movement independently thereof, a slide connected with said drum for axial movement therewith, a crank connected with said slide for the axial adjustment of the slide and drum, a clutch provided with means for manually tripping it for its engagement and adapted for automatic disengagement after a predetermined degree of rotation, driving connections for said crank controlled by said clutch, a second set of driving connections including a clutch and adapted for the rotation of said shaft and drum to said starting point, means for engaging said last mentioned clutch upon the axial work releasing movement of said slide, and means operated in accordance with the rotation of said drum for disengaging said last mentioned clutch at the starting point.

29. In a device of the character described, the combination with a shaft supported for rotation, means for rotating said shaft and stopping it at a point of overrun beyond its starting point, of a drum splined to said shaft for rotative work winding and overlapping movement therewith and for axial work releasing movement independently thereof, a slide connected with said drum for axial movement therewith, a crank connected with said slide for the axial adjustment of the slide and drum, a clutch provided with means for manually tripping it for its engagement and adapted for automatic disengagement after a predetermined degree of rotation, driving connections for said crank controlled by said clutch, a second set of driving connections including a clutch and adapted for the rotation of said shaft and drum, means for engaging said last mentioned clutch upon the axial work releasing movement of said slide to restore said drum to said position after its overrun, means operated in accordance with the rotation of said drum for disengaging said last mentioned clutch, said clutch engaging means being operative in one direction of slide movement only, means for rotating said drum in an opposite direction from that for which said clutch is engaged as aforesaid, and trip mechanism for interrupting the last mentioned rotation of said drum after said drum is rotated for a fractional revolution of overrun beyond its original position for said overlap.

30. In a device of the character described, the combination with a shaft supported for rotation, means for rotating said shaft and stopping it at a point of overrun beyond its starting point, of a drum splined to said shaft for rotative work winding and overlapping movement therewith and for axial work releasing movement independently thereof, a slide connected with said drum for axial movement therewith, a crank connected with said slide for the axial adjustment of the slide and drum, a clutch provided with means for manually tripping it for its engagement and adapted for automatic disengagement after a predetermined degree of rotation, driving connections for said crank controlled by said clutch, a second set of driving connections including a clutch and adapted for the rotation of said shaft and drum, means for engaging said last mentioned clutch upon the axial work releasing movement of said slide to restore said drum to said position after its overrun, means operated in accordance with the rotation of said drum for disengaging said last mentioned clutch, said clutch engaging means being operative in one direction of slide movement only, means for rotating said drum in an opposite direction from that for which said clutch is engaged as aforesaid, trip mechanism for interrupting the last mentioned rotation of said drum after said drum is rotated for a fractional revolution of overrun beyond its original position for said overlap, together with means for intermittently rotating said drum, means for nailing material previously wound thereon during such intermittent rotation, and an additional automatic trip mechanism for interrupting the intermittent rotation thereof.

31. The combination with a rotary forming drum and an independently mounted pressure bar adapted to hold material thereto, of a work engaging jaw associated with said drum and movable to clamp work between it and the drum, and means adapted for operation by said pressure bar for locking said jaw in engagement with work upon the drum.

32. The combination with a rotary forming drum and an independently mounted pressure bar adapted to hold material thereto, of a work engaging jaw associated with said drum, and means adapted for operation by said pressure bar for locking said jaw in engagement with work upon the drum and movable to clamp work between it and the drum, said means including a jaw actuating member and motion transmitting connections leading to said member and including a part movable substantially radially with reference to said drum and projecting thereabove into the path of said pressure bar.

33. In a device of the character described, the combination with a drum supported for rotation, of a pressure bar disposed substantially parallel to the axis of rotation of said drum and mounted for bodily adjustment to and from the drum, a movable jaw mounted upon the drum for rotation therewith and adapted to engage work to be wound upon the drum, and a jaw actuating member having a portion adjustable in the direction of the axis of said drum and projecting for engagement by said pressure bar, said member being provided with actuating connections to said jaw adapted to hold said jaw in work clamping position.

34. In a device of the character described, the combination with a drum supported for rotation, of a pressure bar disposed substantially parallel to the axis of rotation of said drum and mounted for bodily adjustment to and from the drum, a movable jaw mounted upon the drum for rotation therewith and adapted to engage work to be wound upon the drum, and a jaw actuating member having a portion adjustable in the direction of the axis of said drum and projecting for engagement by said pressure bar, said member being connected with said jaw through motion transmitting connections adapted in their ultimate position to lock said jaw in engagement with the work after said member has been acted upon by said pressure bar, together with means for releasing said jaw.

35. In a device of the character described, the combination with a rotary forming drum having a jaw adjustable to and from a portion of its periphery between work engaging and releasing positions, of a rock shaft carrying a cam, a lever pivoted within said drum and arranged to receive motion from said cam, a link connecting said lever with said jaw, an arm upon said rock shaft for the actuation thereof, and a radially adjustable slide projecting beyond said drum and connected with said arm.

36. In a device of the character described, the combination with a rotary forming drum having a jaw adjustable to and from a portion of its periphery between work engaging and releasing positions, of a rock shaft carrying a cam, a lever pivoted within said drum and arranged to receive motion from said cam, a link connecting said lever with said jaw, an arm upon said rock shaft for the actuation thereof, and a radially adjustable slide projecting beyond said drum and connected with said arm, said cam being formed to contact said lever substantially with its greatest effective radius at approximately the position of engagement of said jaw.

37. In a device of the character described, the combination with a rotary forming drum having a jaw adjustable to and from a portion of its periphery between work engaging and releasing positions, of a rock shaft carrying a cam, a lever pivoted within said drum and arranged to receive motion from said cam, a link connecting said lever with said jaw, an arm upon said rock shaft for the actuation thereof, and a radially adjustable slide projecting beyond said drum and connected with said arm, together with a pressure bar adjustable to and from said drum and adapted for contact with said slide in a given position of said drum.

38. In a device of the character described, the combination with a rotary forming drum having a jaw adjustable to and from a portion of its periphery between work engaging and releasing positions, of a rock shaft carrying a cam, a lever pivoted within said drum and arranged to receive motion from said cam, a link connecting said lever with said jaw, an arm upon said rock shaft for the actuation thereof, and a radially adjustable slide projecting beyond said drum and connected with said arm, together with a pressure bar adjustable to and from said drum and adapted for contact with said slide in a given position of said drum, said cam being formed to contact said lever substantially with its greatest effective radius at approximately the position of engagement of said jaw.

39. In a device of the character described, the combination with a drum supported for rotative and axial movements, means associated with the drum for clamping work to the periphery thereof and unclamping it therefrom, and means for producing axial motion of the drum, the parts being so related that motion originating in the means for moving the drum axially causes the clamping means to release the work preparatory to such axial movement of the drum.

40. In a device of the character described, the combination with a drum supported for rotation and for axial movement, of a member adjustable radially with reference to said drum, a jaw upon said drum and adapted to engage work thereon, connections adapted to receive motion from said member for the clamping engagement of said jaw, means for releasing such clamping engagement, and a drum adjusting member arranged to act automatically upon said jaw releasing means preliminary to actuating the drum.

41. In a device of the character described, the combination with a drum having a clamping jaw and supported for axial movement, of means for clamping said jaw for work engagement, a drum actuating member provided with connections with said drum affording a limited degree of independent movement between said member and said drum, and jaw releasing mechanism operatively arranged to be actuated for the release of said jaw by the independent movement of said member with reference to said drum preliminary to the axial adjustment of said drum.

42. In a device of the character described, the combination with an axially adjustable drum having a work clamping jaw, of a drum adjusting member, and motion transmitting connections for the actuation of said jaw between clamping and releasing positions, said connections being adapted to receive motion from said member in a direction to release said jaw.

43. In a device of the character described, the combination with a forming drum having a jaw adjustable adjacent to its periphery, of connections for actuating said jaw including a cam, means for oscillating said cam in a direction to adjust the jaw to a clamping position, said cam being formed to be acted upon through substantially its greatest effective radius when said jaw approaches such position, together with a member mounted for reciprocated movement and having a loose connection with said drum adapted to permit of a fractional proportion of such movement independently of said drum, the remainder of said movement being transmitted to said drum, and means arranged in the path of said member to receive motion therefrom during the independent movement of said member with reference to said drum, said means being connected with said cam for the oscillation thereof in a direction to release the clamping action of said jaw.

44. In a device of the character described, the combination with a drum having a clamping jaw, of a lever connected with said jaw for the oscillation thereof between its clamping and retracted postions, a radially adjustable slide acting upon said lever in a direction to adjust said jaw toward its clamping position, and an axially adjustable slide arranged to act upon said lever in a direction to adjust said jaw toward said releasing position.

45. In a device of the character described, the combination with an axially adjustable drum having a clamping jaw, of a lever operatively connected with said jaw for the oscillation thereof between clamping and releasing positions, means for locking said jaw in its clamping position, and a member axially adjustable with reference to said drum and provided with a cam surface adapted to act upon said lever to release said means and adjust said jaw toward its releasing position.

46. The combination with a winding drum axially movable for withdrawal from the work and having a movable jaw for clamping work thereto, of a lever supported at the end of said drum and connected with said jaw, a member mounted for a limited sliding movement with reference to said drum, a slide connected with said drum through said member, and a cam surface upon said member adapted to interact with said lever in a direction to release said jaw.

47. In a device of the character described, the combination with a winding drum provided with a jaw adjustable to and from a portion of its periphery and adapted to clamp work thereto, of a pressure bar supported for adjustment to and from the drum, an oscillatory arm connected with said jaw for the adjustment thereof between clamping and releasing positions and provided with connections to said jaw adapted in the clamping position of the jaw to be substantially self-locking, a slide radially adjustable with reference to the drum and adapted to act upon said lever in the direction to adjust the jaw to its clamping position, said slide projecting from the jaw in a position to be acted on by the pressure bar, a sleeve having a limited axial movement with reference to said drum and provided with a cam surface adapted for interaction with an arm to produce a jaw releasing movement thereof, and a drum actuating slide connected with said drum through said sleeve, whereby to produce a limited degree of lost motion between said last mentioned slide and said drum, the movement of the slide independently of the drum being adapted to release the jaw preliminary to the movement of the drum.

48. In a device of the character described, the combination with a main frame and a sub-frame guided for movement with reference to the main frame, of a box winding mechanism on the main frame, a stapler on the sub-frame, power driven friction means for mechanically feeding the sub-frame continuously in one direction, and power driven intermittently engageable gearing for feeding the sub-frame intermittently in the other direction, together with a single handle controlling the operation of both said means.

49. In a device of the character described, the combination with a main frame and a sub-frame guided for movement with reference to the main frame, of a box winding mechanism on the main frame, a stapler on the sub-frame, means for feeding the sub-frame continuously in one direction, means for feeding the sub-frame intermittently in the other direction said means comprising a shaft continuously rotatable on one of said frames, a drive wheel on said shaft, a worm on said shaft having a thread of which only a portion has a pitch and another portion has no pitch, a track upon the other of said frames adjustable to and from engagement with said drive wheel, a track on the last mentioned frame adjustable to and from said worm and provided with teeth for mesh therewith, and a handle connected respectively with said tracks for opposite adjustment thereof, whereby selectively to adjust the one track or the other to an operative position with reference respectively to said wheel and said worm.

50. In a device of the character described, the combination with a machine frame and box forming mechanism supported thereon, of a supplemental frame guided for reciprocation with respect to said main frame, a stapling device supported on the supplemental frame in operative relation to said box forming mechanism, a driving shaft for said stapling device, a power driven shaft mounted for continuous rotation on said supplemental frame in alignment with the driving shaft for said stapling device, a clutch for connecting said power driven shaft and said driving shaft, a driving wheel mounted on the driving shaft, a driving gear mounted on the driven shaft, and a pair of tracks connected with said main frame and adapted respectively for interaction with said wheel and gear, said tracks being interconnected for alternative movement into operative position for such interaction.

51. In a device of the character described, the combination with a machine frame and box forming mechanism supported thereon, of a supplemental frame guided for reciprocation with respect to said main frame, a stapling device supported on the supplemental frame in operative relation to said box forming mechanism, a driving shaft for said stapling device, a power driven shaft mounted for continuous rotation on said supplemental frame in alignment with the driving shaft for said stapling device, a clutch for connecting said power driven shaft and said driving shaft, a driving wheel mounted on the driving shaft, a driving gear mounted on the driven shaft, and a pair of tracks connected with said main frame and adapted respectively for interaction with said wheel and gear, said tracks being interconnected for alternative movement into operative position for such interaction, together with a manually operable handle connected with said tracks for the alternative adjustment thereof and operatively associated with said clutch for the actuation thereof into a position for engaging said shaft when said gear has a track in operative relation thereto, said gear being adapted for intermittent action on the track which it engages.

52. In a device of the character described, the combination with a main frame, box forming mechanism thereon, a supplemental frame guided for reciprocation with reference to said main frame and provided with a stapler in operative relation to said box forming mechanism, and a drive shaft for said stapler carried by said main frame; of a shaft mounted for continuous power operation in said supplemental frame; a clutch means for connecting said last mentioned shaft with said driving shaft; a driving wheel connected with the continuously operable shaft; a deformed worm connected with the drive shaft for the stapler and provided with a thread having a portion with a pitch and a portion with no pitch, and tracks alternatively adjustable with reference to said wheel and said worm and formed respectively for interaction therewith.

53. In a device of the character described, the combination with a main frame, box forming mechanism thereon, a supplemental frame guided for reciprocation with reference to said main frame and provided with a stapler in operative relation to said box forming mechanism, and a drive shaft for said stapler carried by said main frame; of a shaft mounted for continuous power operation in said supplemental frame; a clutch means for connecting said last mentioned shaft with said driving shaft; a driving wheel connected with the continuously operable shaft; a deformed worm connected with the drive shaft for the stapler and provided with a thread having a portion with a pitch and a portion with no pitch; and tracks alternatively adjustable with reference to said wheel and said worm and formed respectively for interaction therewith, together with a single handle controlling the adjustment of said tracks and said clutch means.

JOHN ALBRECHT.